(12) United States Patent
Chasen

(10) Patent No.: US 6,524,042 B2
(45) Date of Patent: Feb. 25, 2003

(54) COMPACT EQUIPMENT SECURING APPARATUS

(76) Inventor: Richard Jeffrey Chasen, 308 Oak La., Richmond, VA (US) 23226

( * ) Notice: Subject to any disclaimer, the term of this patent is extended or adjusted under 35 U.S.C. 154(b) by 13 days.

(21) Appl. No.: 09/772,388

(22) Filed: Jan. 29, 2001

(65) Prior Publication Data

US 2001/0007627 A1 Jul. 12, 2001

Related U.S. Application Data

(63) Continuation-in-part of application No. 09/420,766, filed on Oct. 19, 1999, now Pat. No. 6,299,396, which is a continuation-in-part of application No. 09/342,593, filed on Jun. 29, 1999, now Pat. No. 6,135,686.

(51) Int. Cl.[7] .................................................. B60P 7/08
(52) U.S. Cl. ........................... 410/120; 410/77; 410/34; 410/35; 410/38; 182/127
(58) Field of Search .............................. 410/34, 32, 35, 410/38, 77, 120; 224/324, 405, 331, 323, 570; 248/503, 316.4; 182/127

(56) References Cited

U.S. PATENT DOCUMENTS

| | | | |
|---|---|---|---|
| 1,705,381 A | 3/1929 | Snyder | 410/120 |
| 1,826,893 A | 10/1931 | Laren | |
| 2,080,527 A | 5/1937 | Bixel | |
| 2,134,823 A | 11/1938 | Herrmann et al. | |
| 2,840,288 A | 6/1958 | Bradden | 410/120 |
| 3,575,373 A | 4/1971 | Reinhardt et al. | |
| 3,672,612 A | 6/1972 | Laing | |
| 4,008,838 A | 2/1977 | Correll | |
| 4,339,064 A | 7/1982 | Ziaylek, Jr. | |
| 4,369,009 A | 1/1983 | Fulford | 410/35 |
| 4,813,585 A | 3/1989 | Nutt | |
| 4,827,742 A | 5/1989 | McDonald | |
| 5,009,350 A | 4/1991 | Schill et al. | |
| 5,154,258 A | 10/1992 | Krukow | |
| 5,186,588 A | 2/1993 | Satton et al. | 410/120 |
| 5,242,094 A | 9/1993 | Finley | |
| 5,791,857 A | 8/1998 | Ziaylek et al. | |
| 6,059,498 A | 5/2000 | Ostrowski | 410/34 |
| 6,135,686 A | 10/2000 | Chasen | 410/77 |
| 6,299,396 B1 | 10/2001 | Chasen | 410/120 |

Primary Examiner—Stephen T. Gordon
(74) Attorney, Agent, or Firm—Hunton & Williams

(57) ABSTRACT

A compact apparatus for securing equipment to a surface of a vehicle includes an elongate shaft slidably extending through a support member attached to the vehicle. An engagement member is formed on one end of the shaft for engaging and retaining equipment on the exterior of the vehicle. A spring-loaded latching assembly is provided to retain the engagement member in a securing relationship with the equipment. The latching assembly illustratively includes an arrangement for transferring a biasing force from a spring to the shaft to bias the shaft in a condition wherein the engagement member secures the equipment in place. The latching assembly includes control lever and a cam arrangement that allows easy manual operation of the latching assembly.

31 Claims, 28 Drawing Sheets

COMPACT EQUIPMENT SECURING APPARATUS

This application is a continuation-in-part of U.S. application Ser. No. 09/420,766, filed Oct. 19, 1999, and now U.S. Pat. No. 6,299,396 issued Oct. 9, 2001, which is a continuation-in-part of U.S. application Ser. No. 09/342,593, filed Jun. 29, 1999 now U.S. Pat. No. 6,135,686 issued Oct. 24, 2000, both of which are incorporated by reference herein in their entirety. It is also related to U.S. application Ser. No. 09/409,996, filed Sep. 30, 1999 which is a continuation-in-part of application Ser. No. 09/342,593, and is also incorporated by reference herein in its entirety.

BACKGROUND OF THE INVENTION

The present invention relates broadly to apparatus for securing equipment to vehicles and, more particularly, to an apparatus for securing equipment such as ladders to an exterior portion of the vehicle with the apparatus being controllable from an interior portion or an exterior portion of the vehicle.

Ladders, hoses and other elongate equipment that may be required at a job site, rescue site or other event can typically be difficult to transport to and from the event. Construction workers, house painters, firemen, rescue personnel and even homeowners may need to transport ladders or other elongate equipment over highways with their vehicle. Typically, the vehicle may be a truck or van. The equipment is typically sufficiently elongate that the ladders or other equipment cannot be carried within the confines of the vehicle body, or the bed of a pick-up truck.

Typically, ladders and other elongate equipment are lashed to an overhead rack with rope, bungee cords, chains or other strand-like elements. Such impromptu tiedown arrangements can provide an unsafe condition when the vehicle is operated on a roadway. Further, should the vehicle be left unattended, the lack of any locking or securing of the ladders can lead to theft.

Danger also exists when placing ladders on the racks. Typically, when bungee cords or ropes are used, the person securing the ladder to the rack must stand on the bumper, tires, or other body structure to gain access to the ladders that are disposed on the roof or other elevated portion of the vehicle. Similar safety hazards exist when trying to remove ladders stowed on the ladder rack and lashed down with bungee cords or other strands.

The equipment can also become missile-like hazards in the event of a vehicle crash.

Accordingly, there exists a need for a device for securely attaching ladders or other elongated equipment to overhead racks or other body panel-mounted support structures while providing an added measure against theft.

SUMMARY OF THE INVENTION

It is accordingly an object of the present invention to provide a simple and effective equipment securing apparatus that will securely retain the equipment against a support structure, wall, platform or vehicle exterior.

It is another object of the present invention to provide such an equipment securing apparatus that allows the securing of equipment to the exterior of a vehicle using a latching assembly disposed in the interior of the vehicle or to a platform using a latching assembly disposed on the opposite side of the platform.

It is yet another object of the present invention to provide an equipment securing apparatus having a latching assembly that is compact and that has minimal impact on vehicle storage space.

It is still another object of the present invention to provide a latching assembly that is manually operable but requires only minimal effort to cause the securing apparatus to securely engage the equipment.

To these ends, an equipment securing apparatus is provided for securing equipment to a vehicle. The securing apparatus comprises an elongate shaft having a proximal end and a distal end and an equipment engagement member formed on the distal end of the shaft for securing engagement with equipment on the vehicle. The securing apparatus further comprises a latching assembly attachable to a portion of the vehicle. The latching assembly includes a housing having an upper wall and a shaft retaining portion with a passageway formed therein. The shaft is slidably mounted to the housing and extends through the passageway of the shaft retaining portion. The latching assembly also includes a spring mounted within the housing adjacent the upper wall. A spring support member and a load transfer member are mounted to the shaft. The spring support member and the load transfer member are configured for transferring a biasing force from the spring to the shaft. A spring compression control assembly is operatively connected to the spring support member. The latching assembly of the securing apparatus is selectively operable to retain the engagement member in a securing relationship with the equipment and to release the engagement member from the securing relationship.

The latching assembly of an equipment securing apparatus according to the present invention may be operable from an interior portion of a vehicle, the vehicle having body panels defining the interior portion and an area exterior to the vehicle. In this case, the equipment to be secured is supported by an exterior surface of the vehicle. At least one of the body panels of the vehicle has at least one body panel opening formed therein and the elongate shaft of the equipment securing apparatus is extendable through the at least one body panel opening.

The spring support member of an equipment securing apparatus according to the present invention preferably includes a cylindrical bore in substantial registration with the passageway, the shaft being slidably disposed therethrough. The spring is preferably a helical spring disposed around the shaft intermediate the spring support member and the upper wall.

The latching assembly of the securing apparatus according to the present invention may include a slider guide rod attached to the spring support member. The spring compression control assembly may then include a cam lever arm pivotably attached to the housing. A cam may be attached to a control arm that is pivotably attached to the housing. The cam lever arm is configured for engaging the cam and the slider guide rod so that rotation of the control arm causes rotation of the cam lever arm and translation of the spring support member.

The load transfer member of an equipment securing apparatus according to the present invention may include a locking collar having a collar passage with said shaft slidably extending therethrough. The locking collar may be attached to the spring support member.

The shaft of an equipment securing apparatus according to the present invention may include a plurality of spaced apart holes formed therein and the load transfer member may include a locking pin selectively disposed in one of said plurality of spaced apart holes.

The engagement member of an equipment securing apparatus according to the present invention may be formed on the shaft and may include a first engagement arm projecting laterally away from the distal end of the shaft. The engagement arm may be curved to form a hook-like member. The engagement member may also include a second engagement arm projecting laterally away from the distal end of said shaft, generally oppositely from the first engagement arm.

The shaft of an equipment securing apparatus according to the present invention is preferably rotatably mounted to the shaft retaining portion of the housing so that the shaft may be selectively rotated to move the engagement member to a desired orientation with respect to the equipment to be secured.

An equipment securing apparatus according to the present invention may further comprise an elongate support beam having at least one aperture formed therethrough. The elongate support beam is attachable to the vehicle and is configured for attachment of the housing thereto. The housing is selectively attachable to the support beam so that the passageway is in substantial alignment with a selected one of the at least one aperture and the shaft is slidably disposed through the selected one of the at least one aperture. The elongate support beam is attachable to the vehicle so that the selected one of the at least one aperture is in substantial alignment with an opening in a body panel of the vehicle and the elongate shaft is extendable through the body panel opening.

In an illustrative embodiment of an equipment securing apparatus for securing equipment to a vehicle according to the present invention, the equipment securing apparatus comprises an elongate shaft having a proximal end and a distal end. An equipment engagement member is formed on the distal end of the shaft for securing engagement with equipment on the vehicle. The securing apparatus further comprises a latching assembly attachable to a portion of the vehicle. The latching assembly includes a housing having an upper wall and a shaft retaining portion with a passageway formed therein. The shaft is slidably mounted to the housing and extends through the passageway of the shaft retaining portion. The latching assembly also includes a spring support member having a cylindrical bore in substantial registration with the passageway, the shaft being slidably disposed therethrough. A helical spring is disposed around the shaft intermediate the spring support member and the upper wall. The latching assembly also includes means for transferring a biasing force from the spring to the shaft through the spring support member and means for selectively compressing and decompressing the spring. The latching assembly is selectively operable to retain the engagement member in a securing relationship with the equipment and to release the engagement member from the securing relationship.

The latching assembly of this illustrative embodiment may include a slider guide rod attached to the spring support member. The means for selectively compressing and decompressing the spring may include a cam lever arm pivotably attached to the housing, a control arm pivotably attached to the housing, and a cam attached to the control arm. The cam lever arm may be configured for engaging the cam and the slider guide rod so that rotation of the control arm causes rotation of the cam lever arm and translation of the spring support member.

The means for transferring a biasing force of a securing apparatus according to the present invention may include a locking collar having a collar passage with the shaft slidably extending therethrough. The locking collar may be attached to the spring support member.

The means for transferring a biasing force of an equipment securing apparatus according to the present invention may include a plurality of spaced apart holes formed in the shaft and a locking pin selectively disposed in one of said plurality of spaced apart holes.

In another illustrative embodiment of the present invention, an equipment securing apparatus for securing equipment to a vehicle comprises an elongate shaft having a proximal end and a distal end and an equipment engagement member formed on the distal end of the shaft for securing engagement with equipment on the vehicle. The securing apparatus further comprises a latching assembly attachable to a portion of the vehicle. The latching assembly includes a housing having an upper wall and a shaft retaining portion with a passageway formed therein. The shaft is slidably mounted to the housing and extends through the passageway of the shaft retaining portion. The latching assembly further includes a helical spring mounted within the housing adjacent the upper wall, the spring being disposed around the shaft. The latching assembly also includes a spring support member having a cylindrical bore in substantial registration with the passageway, the shaft being slidably disposed therethrough. The spring is disposed intermediate the spring support member and the upper wall. A slider guide rod is attached to the spring support member and a load transfer member is mounted to the shaft. The load transfer member and the spring support member are configured for transferring a biasing force from the spring to the shaft. The latching assembly also includes a spring compression control assembly operatively connected to the spring support member. The spring compression control assembly includes a cam lever arm pivotably attached to the housing, a control arm pivotably attached to said housing, and a cam attached to said control arm. The cam lever arm is configured for engaging the cam and the slider guide rod so that rotation of the control arm causes rotation of the cam lever arm and translation of the spring support member. The latching assembly is selectively operable to retain the engagement member in a securing relationship with the equipment and to release the engagement member from the securing relationship.

An equipment securing apparatus for securing equipment to a support structure according to the present invention comprises an elongate shaft having a proximal end and a distal end and an equipment engagement member formed on the distal end of the shaft for securing engagement with equipment on the support structure. The equipment securing apparatus further comprises a latching assembly including a shaft support member attachable to a portion of the support structure. The shaft support member has a shaft retaining portion with a first passageway formed therein, the shaft being slidably disposed therethrough. The latching assembly also includes a spring support member having a second passageway in substantial registration with the first passageway, said shaft being slidably disposed therethrough. A helical spring is disposed around the shaft intermediate the shaft support member and the spring support member. The latching assembly further includes means for transferring a biasing force from the spring to the shaft through the spring support member and means for selectively compressing and decompressing said spring. The latching assembly is selectively operable to retain the engagement member in a securing relationship with the equipment and to release the engagement member from the securing relationship.

By the above, the present invention provides a simple and effective device for securing ladders to a vehicle body, especially to an equipment rack on a vehicle body. The present invention further provides a compact latching arrangement that may be secured within the confines of the vehicle interior without significant detrimental impact on storage space therein.

DESCRIPTION OF THE PREFERRED EMBODIMENT

Figure 1:
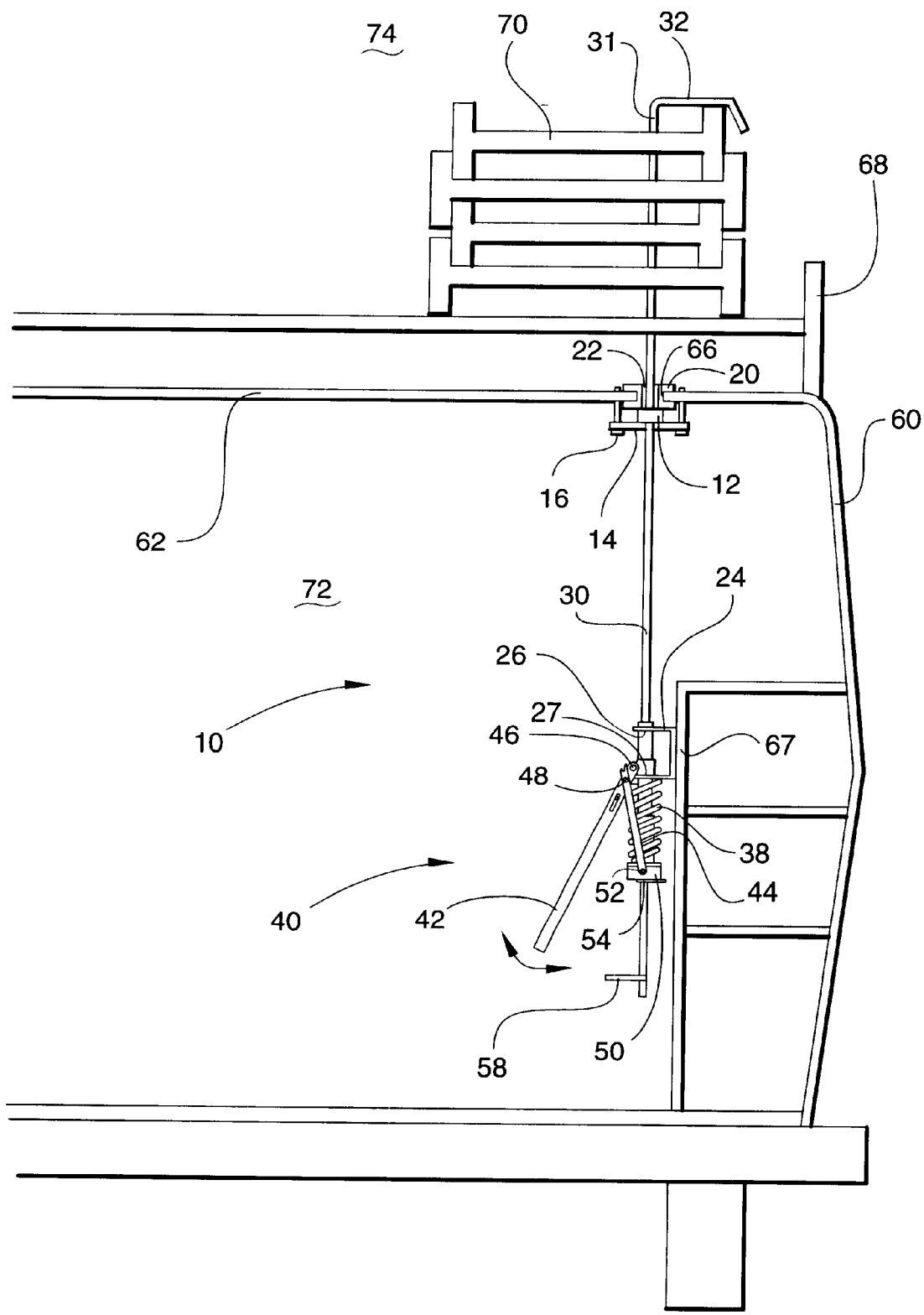
FIG. 1 is an end view of a vehicle having an equipment securing apparatus according to an embodiment of the present invention.

Turning now to the drawings and, more particularly to FIG. 1, an equipment securing apparatus for securing equipment to an exterior surface of a vehicle is illustrated generally at 10 and includes an elongate shaft 30. The shaft 30 includes an engagement arm 32 extending laterally away from a distal end 31 of the shaft 30. The engagement arm 32 may be formed into a hook for engagement with ladders 70. The apparatus 10 is mounted in a vehicle 60 having vehicle body panels 62. An opening 66 is formed in the vehicle body panel through which the shaft 30 may pass. The shaft 30 is freely rotatable in the opening 66 in the body panel 62. It should be noted that while the opening 66 in the body panel 62 is shown in the overhead portion of the vehicle 60, the present invention may be practiced with the shaft 30 oriented horizontally and extending through an opening in a side panel of the vehicle 60.

It will be understood by those having ordinary skill in the art that the term equipment as used herein is intended to encompass tools, ladders, containers, structural materials and any other objects that are temporarily secured for transportation or use. It will also be understood that the engagement arm 32 may be configured in any way that facilitates engagement with a particular type of equipment.

An equipment rack 68 is disposed on top of the vehicle 60 and is illustrated as carrying a plurality of ladders 70. The body panels 62 define an interior portion 72 of the vehicle and an area 74 exterior of the vehicle. The ladders 70 are carried on the ladder rack 68 exterior of the vehicle.

An interior rack 67 or other support fixed to the vehicle is provided for mounting a lower portion of the shaft 30 within the interior 72 of the vehicle 60, as will be explained in greater detail hereinafter.

As previously stated, the shaft 30 extends through an opening 66 formed in a vehicle body panel 62. To prevent weather damage to the vehicle and its contents, a generally circular grommet 20 is attached to the opening 66 in the vehicle. The grommet may be a conventional grommet which is nothing more than essentially two rubber washers joined by a cylindrical member with one rubber washer exterior to the opening 66 and the other rubber washer interior to the opening 66. Alternately, a wear ring 22 formed from a wear resistant material may be provided within the grommet for contact with the rotatable shaft 30 to prevent wear to the grommet 20 which is generally a rubber member.

Figure 4:
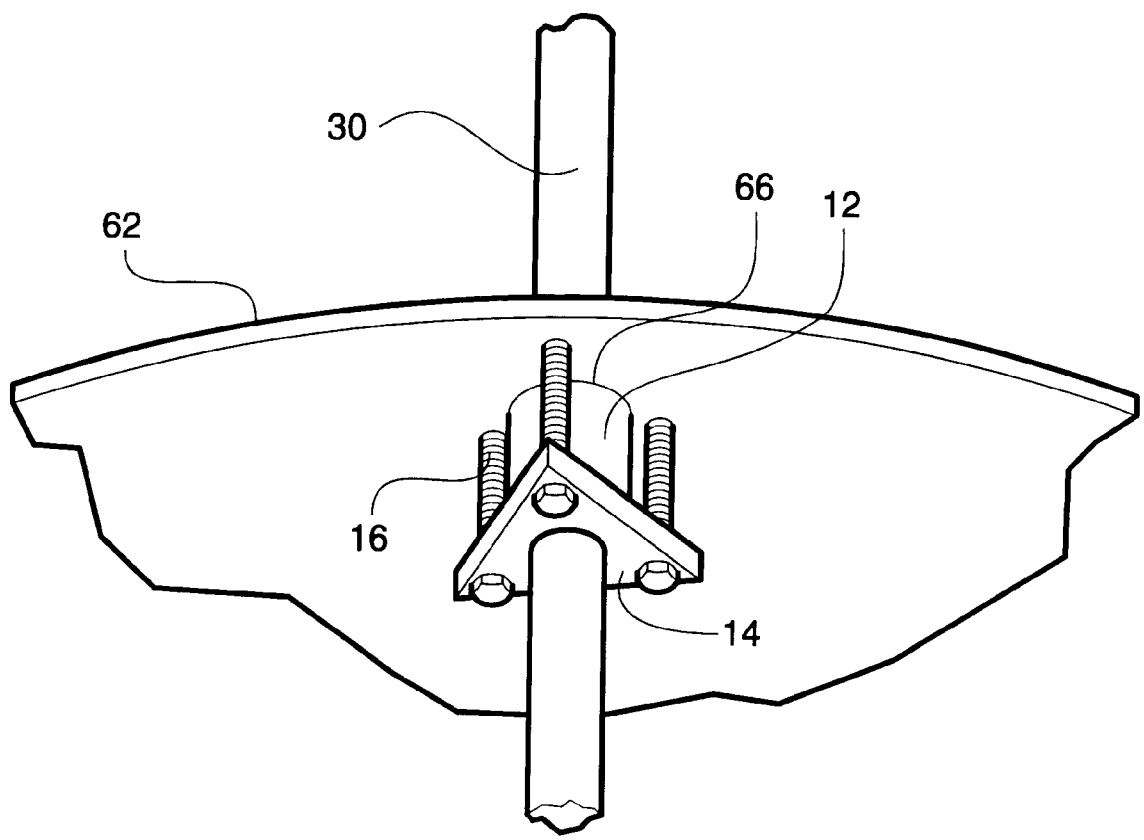
FIG. 4 is a perspective view of an attachment plate arrangement according to the present invention.

A first support member 12 is disposed within the interior of the vehicle 72 to support the shaft 30. The first support member 12 is formed as a generally hollow cylinder through which the shaft 30 passes. The first support member 12 is placed in abutment with the grommet 22 on the interior portion of the vehicle. In order to retain the first support member 12 in place, an attachment plate 14 is provided. The attachment plate 14 is also illustrated in FIG. 4 and may be formed as a triangular member or other geometric configuration. A plurality of bolts 16 extend from the attachment plate 14 through the body panel 62 and may be individually tightened so as to individually adjust pressure on different portions of the first support member 12. This may be used to account for and overcome surface irregularities on the inner surface of the body panel 62.

The first support member 12 and its associated structure generally stabilizes the shaft along an upper portion and directs the shaft outwardly into the area 74 exterior of the vehicle for engagement of the engagement member 32 with the ladders 70. The shaft 30 is also stabilized in a lower portion of the vehicle by a second support member 24.

Figure 2:
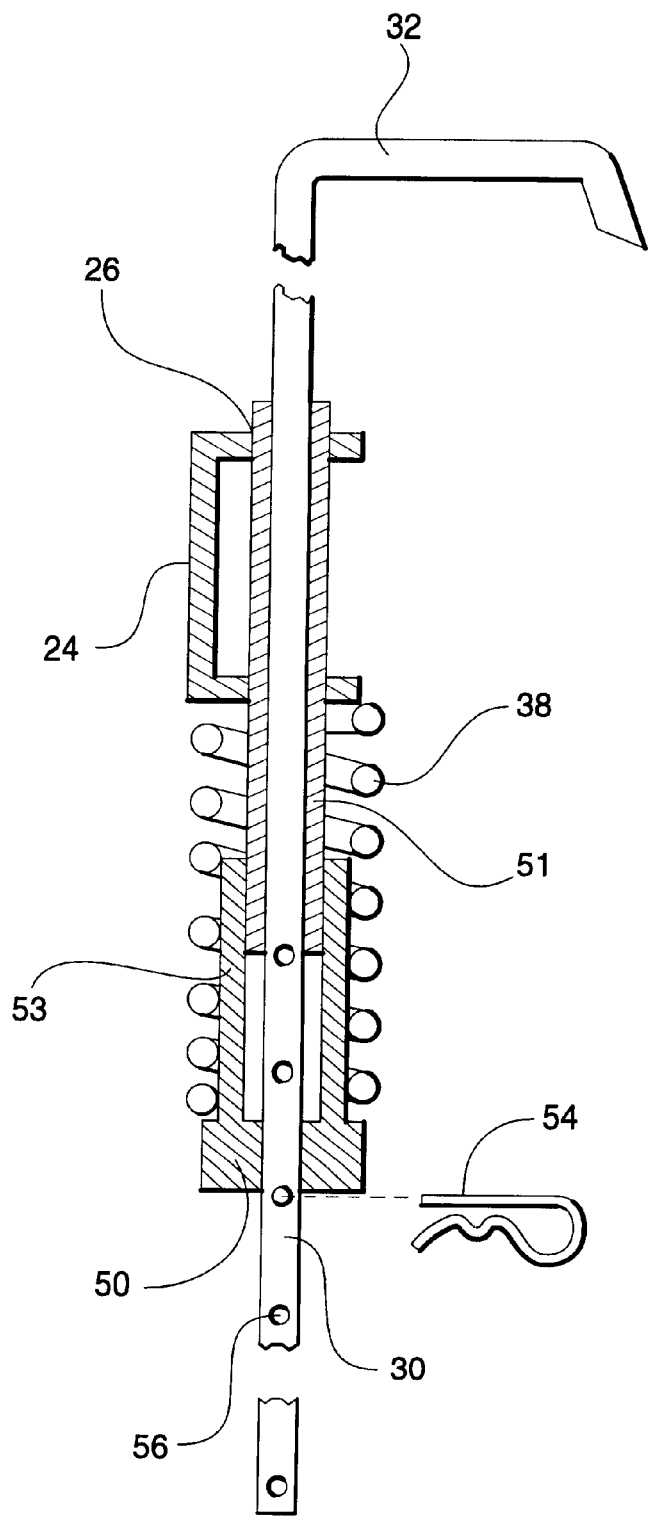
FIG. 2 is a cutaway side view of a latching assembly and engagement member according to an embodiment of the present invention.

The second support member 24 is generally formed as a plate having two arms projecting outwardly therefrom with passageways 26, 27 formed in each arm. The second support member 24 is attached to the interior rack 67 of the vehicle to provide a thrust surface for the latching assembly 40 as will be explained in greater detail hereinafter. As shown in FIG. 2, a support tube 51 is mounted to the second support member through passageways 26 and 27. The shaft 30 extends through the support tube 51 in a manner allowing the shaft 30 to rotate. A handle 58 is removably attached to the shaft beneath the latching assembly 40 for aid in manipulating and positioning the shaft 30 and the engagement arm 32. Optionally, a knob (not shown) may be fitted to the base of the shaft 30 instead of the handle 58.

Figure 3:
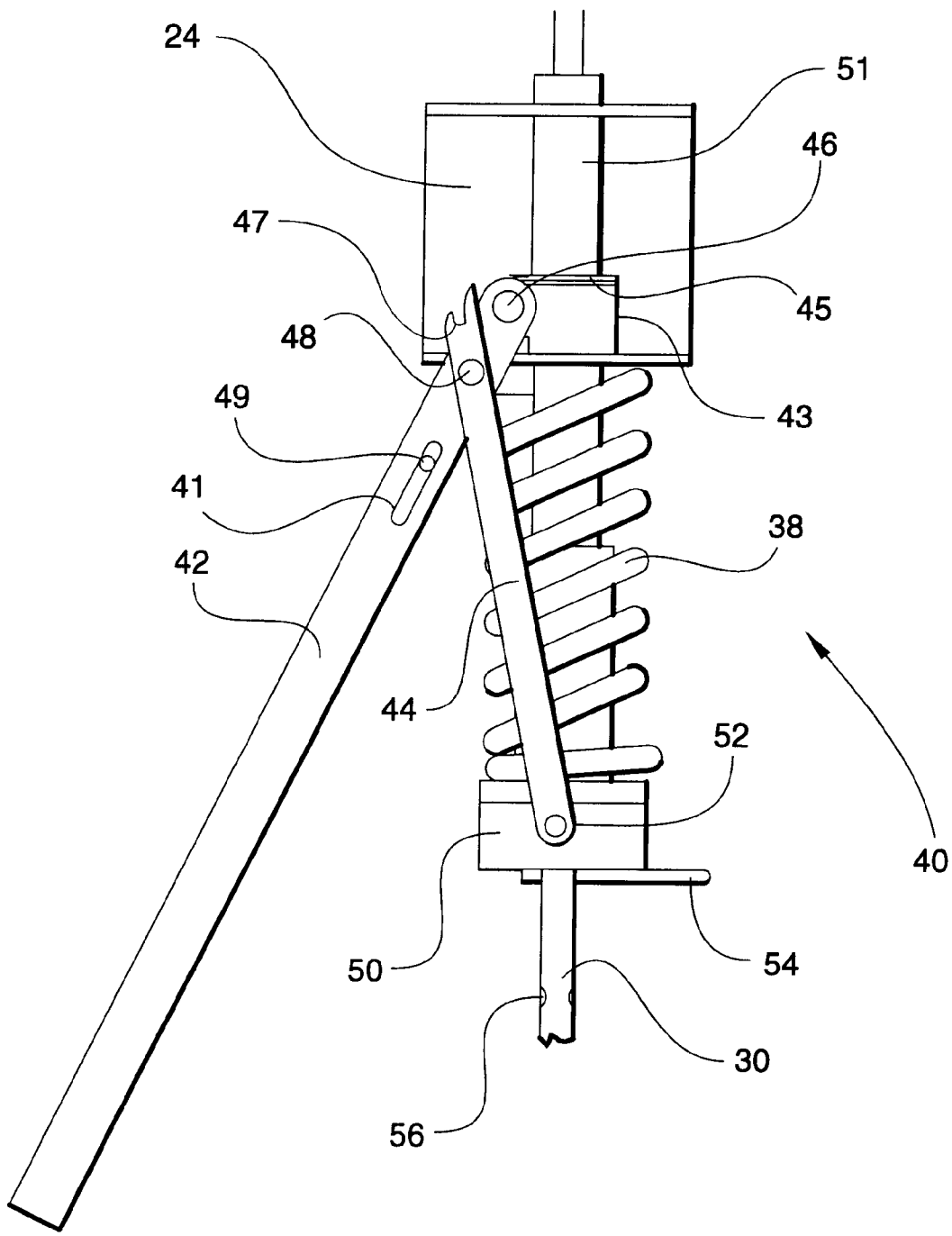
FIG. 3 is a side view of the latching assembly shown in FIG. 2.

A latching assembly 40 is provided and is also illustrated in FIGS. 2 and 3. The latching assembly allows movement of the shaft and acts to prevent movement of the shaft when it is purposefully engaged with ladders 70 or other equipment. The second support member 24 provides a base for the latching assembly 40.

An elongate control arm 42 is pivotally mounted to a U-shaped collar 43 at a control arm pivot 46. The collar 43 is rotatably mounted to the support tube 51 and is retained adjacent the lower arm of the second support member 24 by a snap ring 45. Motion of the control arm 42 is illustrated by an arrow in FIGS. 1 and 7. A slider 50 is disposed on the shaft 30 beneath the second support member 24 in an overlying, sliding relationship with the shaft 30 and the support tube 51. A link 44 extends from the control arm 42 to the slider 50. The link 44 is pivotally mounted to the control arm 42 at a pivot 48 and to the slider 50 at a pivot 52. Therefore, rotational movement of the control arm 42 is transmitted through the link 44 to the slider 50 which undergoes translatory motion along the shaft 30. It should be noted that while only one side of the latching assembly 40 is illustrated, there are two links 44 provided in order to present a balanced load on the slider 50.

Because both the collar 43 and the slider 50 are rotatable relative to the support tube 51 and the shaft 30, the control arm 42 may be rotated approximately 200 degrees around the axis of the shaft 30. This permits the user to position the control arm 42 for best leverage and then reposition the control arm 42 to a more convenient storage position. This capability significantly adds to the convenience of operation of the equipment securing apparatus.

The latching assembly 40 includes a safety locking pin 49 slidably disposed in a slot 41 in the control arm 42. The locking pin 49 is configured for selective engagement with a locking notch 47 in the end of the link 44 when the control arm 42 is rotated to a position parallel to the link 44. When the locking pin 49 is engaged with the locking notch 47, the control arm 42 is prevented from rotating about the pivot 46.

In order to latch the engagement member 32 in an engaging relationship with the ladder 70, the slider 50 must be engaged with the shaft 30 to prevent further movement of the shaft 30 when the engagement member 32 engages the ladder 70. To that end, a spring 38 is disposed intermediate the slider 50, which functions as a spring support member, and the second support member 24. As seen in FIGS. 2 and 3, the slider 50 includes an upstanding tubular portion 53 that telescopically receives the shaft support tube 51 which extends through the second support member 24. Further, a plurality of openings 56 are formed in the shaft in areas adjacent the latching assembly 40. A stop member such as a pin 54, which may be a cotter pin or other type of pin-like member is provided and configured for fitment through a select one of the openings 56 in order to prevent further downward movement of the spring-driven slider member 50. This relationship is best seen in FIG. 2. FIG. 3 illustrates the latching assembly 40 in a latched condition with the pin 54 projecting through one of the openings 56 in the shaft 30. It should be noted that the shank of a padlock (not shown) or a cable lock (not shown) can be passed through the shaft openings 56 for enhanced security.

In operation, a plurality of ladders 70 or other equipment are applied to the ladder rack 68 as illustrated in FIG. 1. From inside or outside the vehicle, the shaft 30 is manipulated and positioned such that the engagement member 32 is in engagement with the outermost ladder 70. It should be noted that the shaft 30 may be rotated a full 360° as necessary to provide a proper engagement of the engagement member 32 with the ladders 70 or other equipment load. Once the ladders 70 are positioned with the engagement member 32 in contact therewith in a desirable position, the control arm 40 is rotated upwardly about the pivot 46. This in turn moves the slider 50 upwardly against the biasing force of the spring 38. The control arm 40 may be locked in an upwardly rotated position using the locking pin 49 and locking notch 47 as will be described in more detail hereafter. The operator observes the shaft 30 until an opening 56 is revealed below the slider 50. At that time, the pin 54 is inserted in the opening 56, and the control arm 42 is released. The spring 38 acts to bias the slider 50 against the spring 54 which transmits this force to the shaft 30, pulling downwardly on the shaft 30 and engaging the ladders 70 with the engagement arm 32. In this manner, the ladders 70 are retained in place on the rack 68 by the engagement arm 32. In order to release the ladders, the operator must once again pull upwardly on the control arm 42 against the bias of the spring 38 which removes any force on the pin 54 which may then be removed. The shaft 30 may then be moved and the ladders 70 removed from the rack. Since the operable portion of the assembly is contained within the confines of the vehicle interior 72, locking the vehicle bars access to the latching assembly 40 and therefore acts to securely lock the ladders 70 to the rack 68.

During the engagement process, the operator may lock the control arm 42 in an upwardly rotated position by engaging the locking pin 49 with the locking notch 47. The locking pin 49 is disposed within the control arm slot 41 so that the locking pin 49 is pulled by gravity toward whichever end of the slot 41 is lower. When the control arm 42 is rotated upward, the locking pin 49 slides toward the end of the slot 41 nearer the pivot 46. When the control arm 41 reaches a position substantially parallel to the link 44, the locking pin 49 drops into engagement with the locking notch 47. This effectively locks the slider 50 and the compressed spring 38 so that the pin 54 may be inserted in the selected opening 56 without the danger of the spring 38 causing the slider 50 to engage the pin 54 prematurely.

Figure 5:
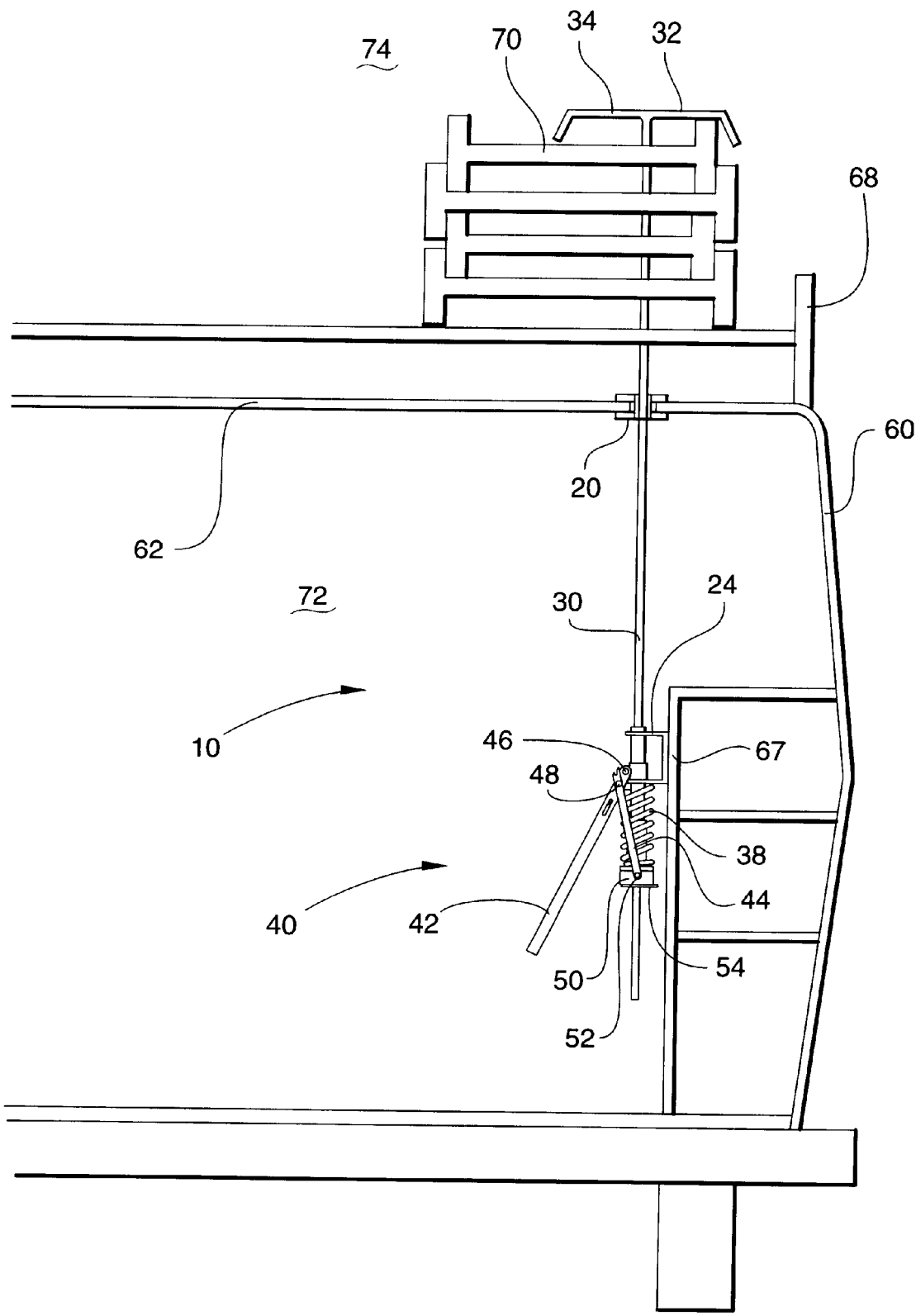
FIG. 5 is an end view of a vehicle having an equipment securing apparatus according to another embodiment of the present invention.
Figure 6:
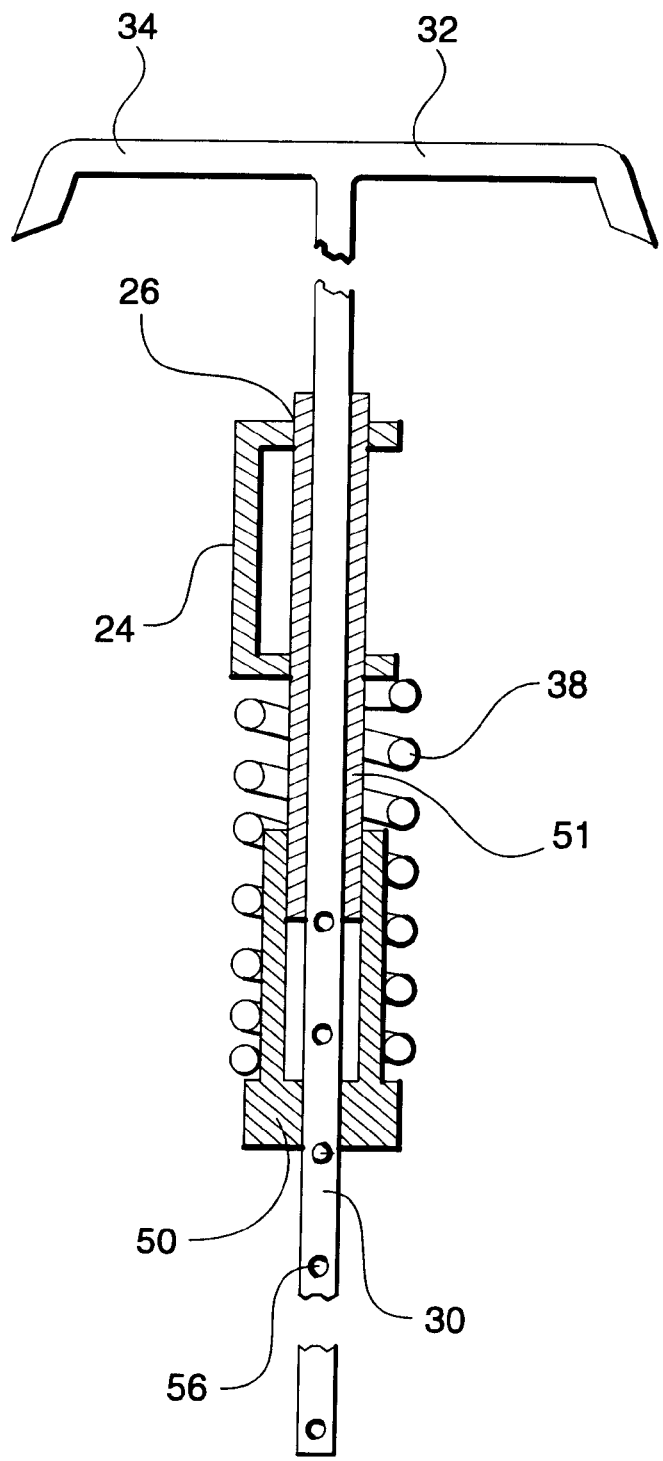
FIG. 6 is a cutaway side view of a latching assembly and an engagement member according to an embodiment of the present invention.
Figure 7:
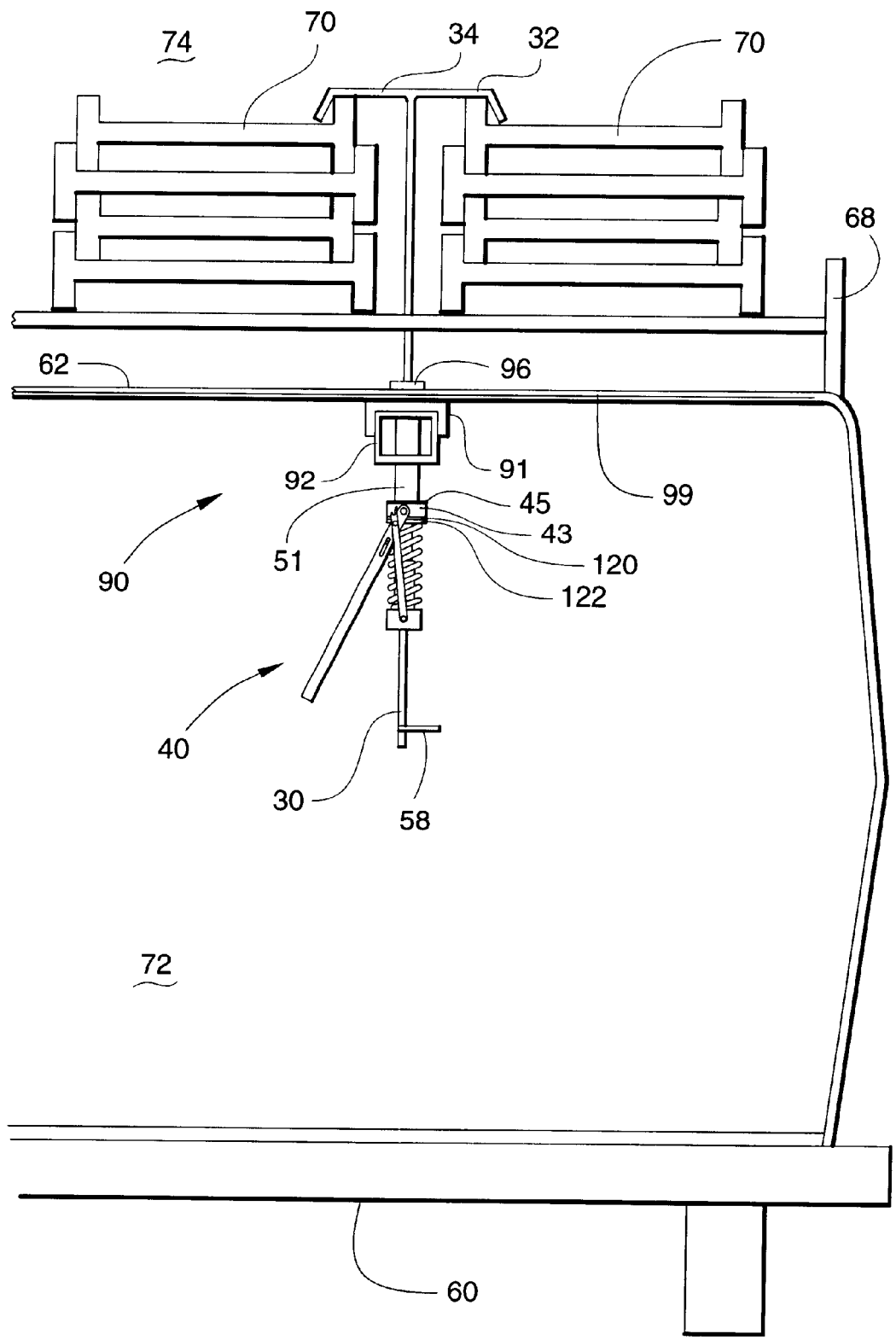
FIG. 7 is a cutaway end view of a vehicle having an equipment securing apparatus according to another embodiment of the present invention.

An alternate embodiment of the engagement member 32 of the present invention is illustrated in FIGS. 5–7. There, a second engagement arm 34 projects laterally away from the distal end of the shaft 30 for engagement with ladders, or other equipment. As illustrated in FIG. 7, the second engagement arm 34 may be used to secure an additional set of ladders 70.

Figure 8:
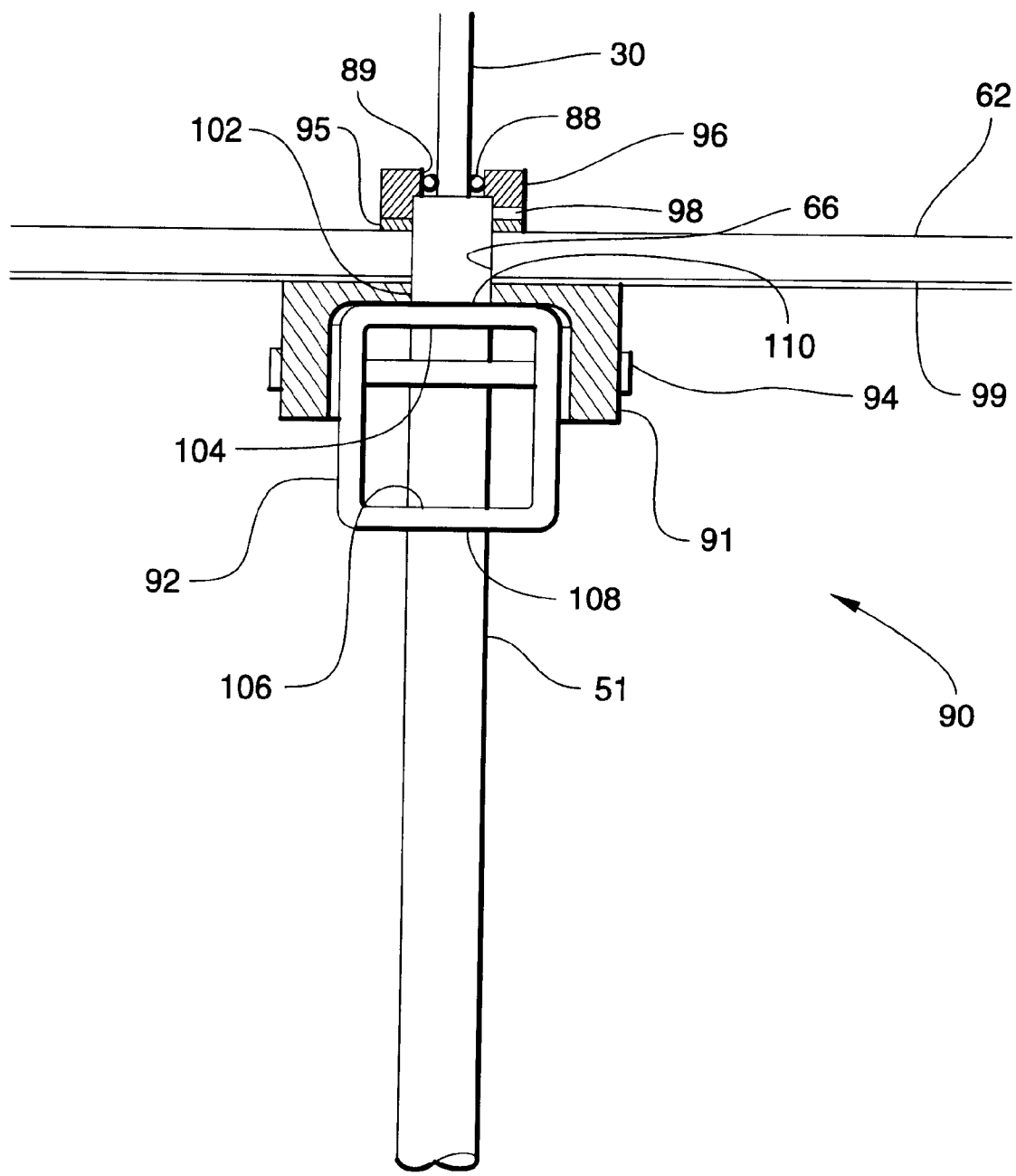
FIG. 8 is an end view of the roof attachment assembly of the equipment securing apparatus shown in FIG. 7.

An alternate embodiment of the equipment securing apparatus 10 is illustrated in FIGS. 7 and 8. As with the previous embodiment, the equipment securing apparatus 10 includes a shaft 30, an engagement member 32, a support tube 51 and a latching assembly 40. In this embodiment, however, the support tube 51 extends through the opening 66 in the vehicle body panel 62. The support tube 51 is attached to the vehicle body panel 62 using a roof attachment assembly 90.

The roof attachment assembly 90 includes a support beam 91 that is preferably formed as a channel and that is attached to the body panel 62. The support beam 91 may be positioned so that it spans two or more lateral roof beams 99. The support beam 91 includes a beam passageway 102 aligned with the opening 66 for receipt of the support tube 51. A support collar 92 is disposed within the channel of the support beam 91 and attached to support beam 91 using two bolts 94. The support collar 92 is formed as a tube having a generally square cross-section. The support collar 92 includes two collar passageways 104, 106 aligned with the beam passageway 102 and the opening 66 for receipt of the support tube 51. Once disposed through the opening 66 and the passageways 102, 104, 106, the support tube 51 is held in place using snap rings 108, 110 above and below the support collar 92. A sealing pad 96 serves to prevent moisture or other external contaminants from entering the interior of the vehicle. The sealing pad 96 has a shaft passageway 89 through which the shaft 30 is received and is attached to the end of the support tube 51 using a set screw 98. An O-ring 88 is positioned within the shaft opening 89 to provide a seal around the shaft. A layer of foam 95 is disposed between the seal pad 96 and the vehicle panel 62 to protect the vehicle panel from damage.

The latching assembly 40 of this embodiment may be configured and operated as in the other embodiments. It will be appreciated that the control arm 42 must be sufficiently spaced from the panel 62 so that the locking pin 49 can be engaged with the locking notch 47. A washer 120 supported by a snap ring 122 is disposed around the support tube 51 to provide a bearing surface for the collar 43.

Figure 9:
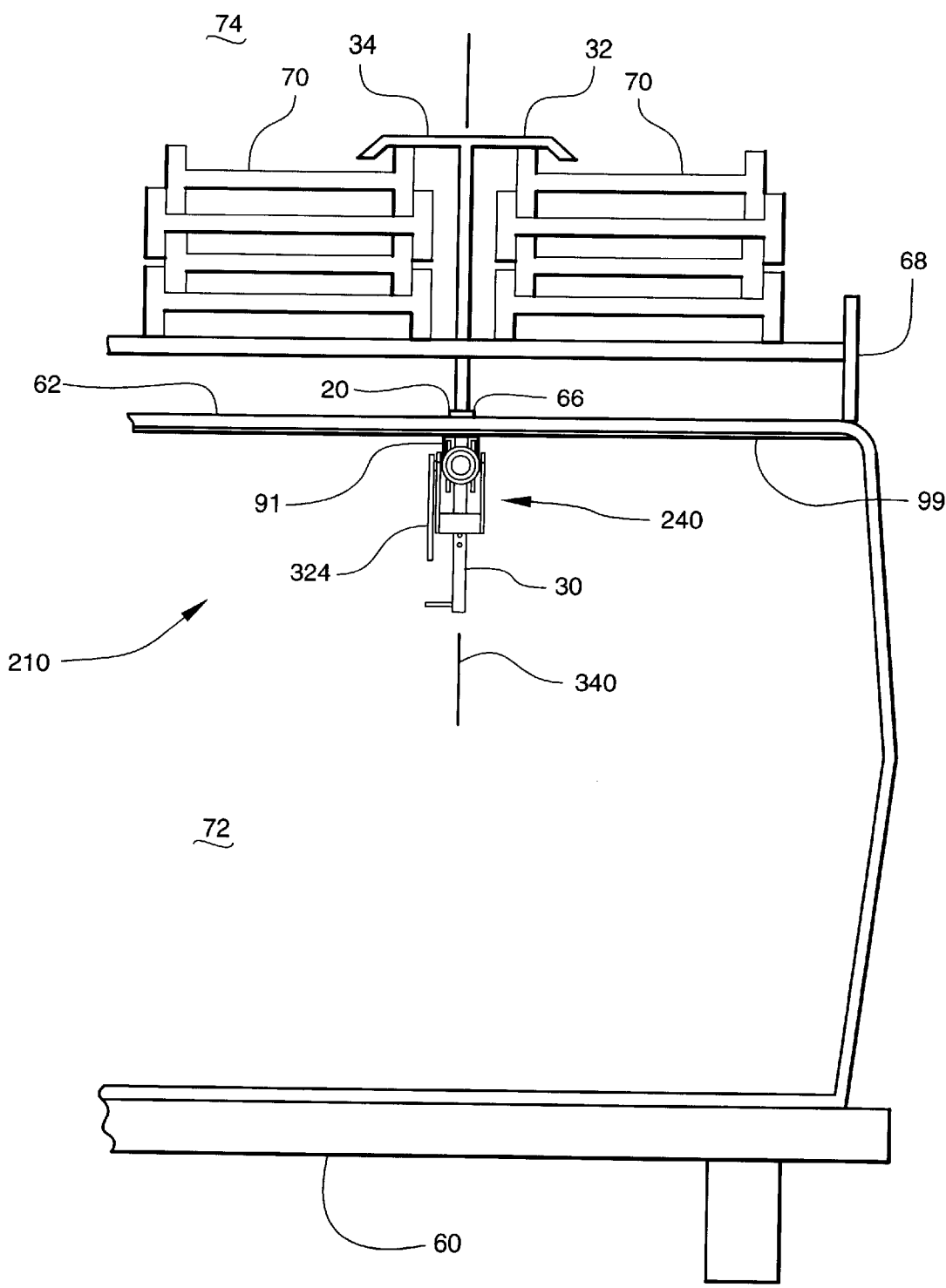
FIG. 9 is an end view of a vehicle having an equipment securing apparatus according to another embodiment of the present invention.
Figure 10:
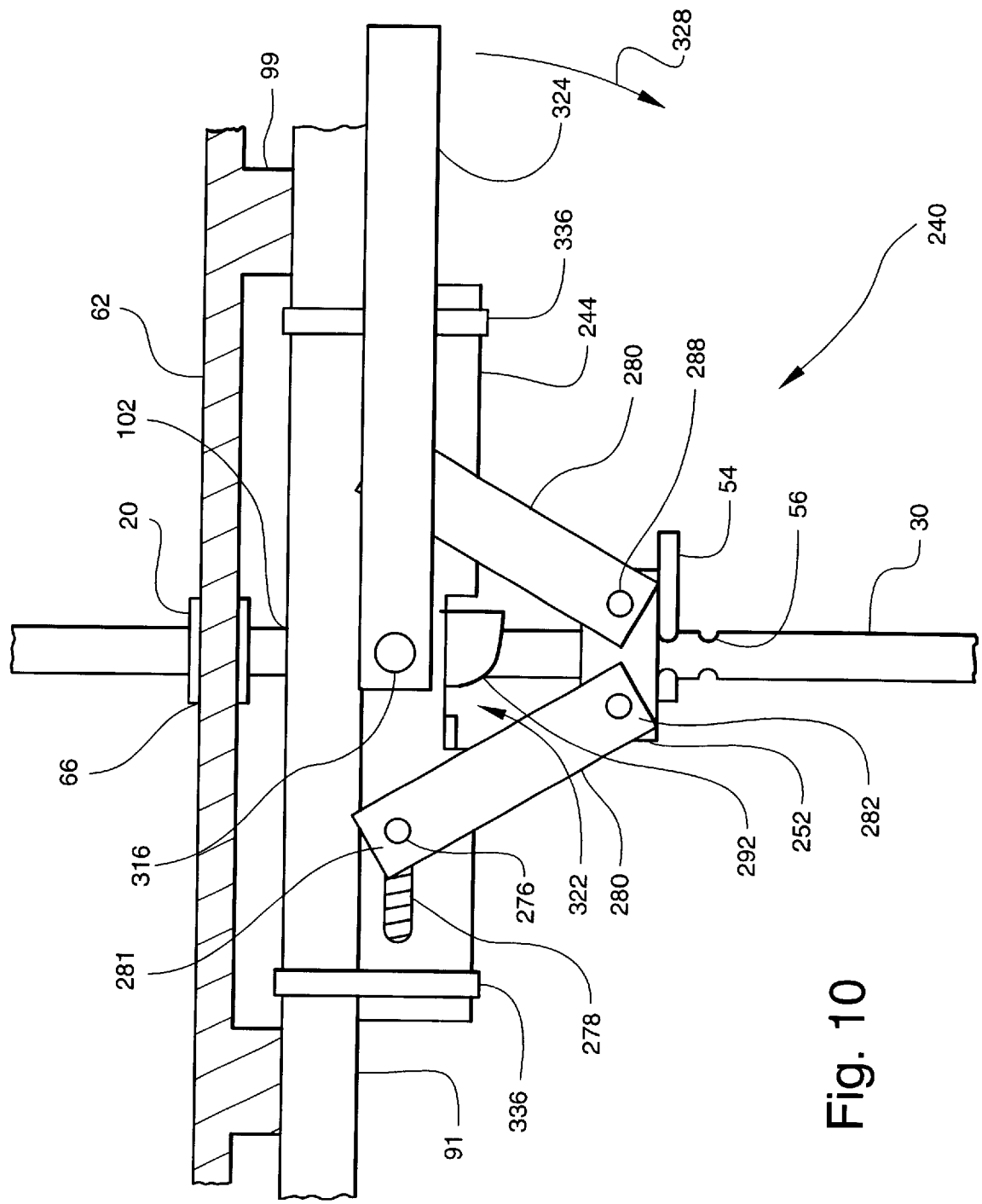
FIG. 10 is a side view of a latching assembly of the equipment securing apparatus shown in FIG. 9.
Figure 11:
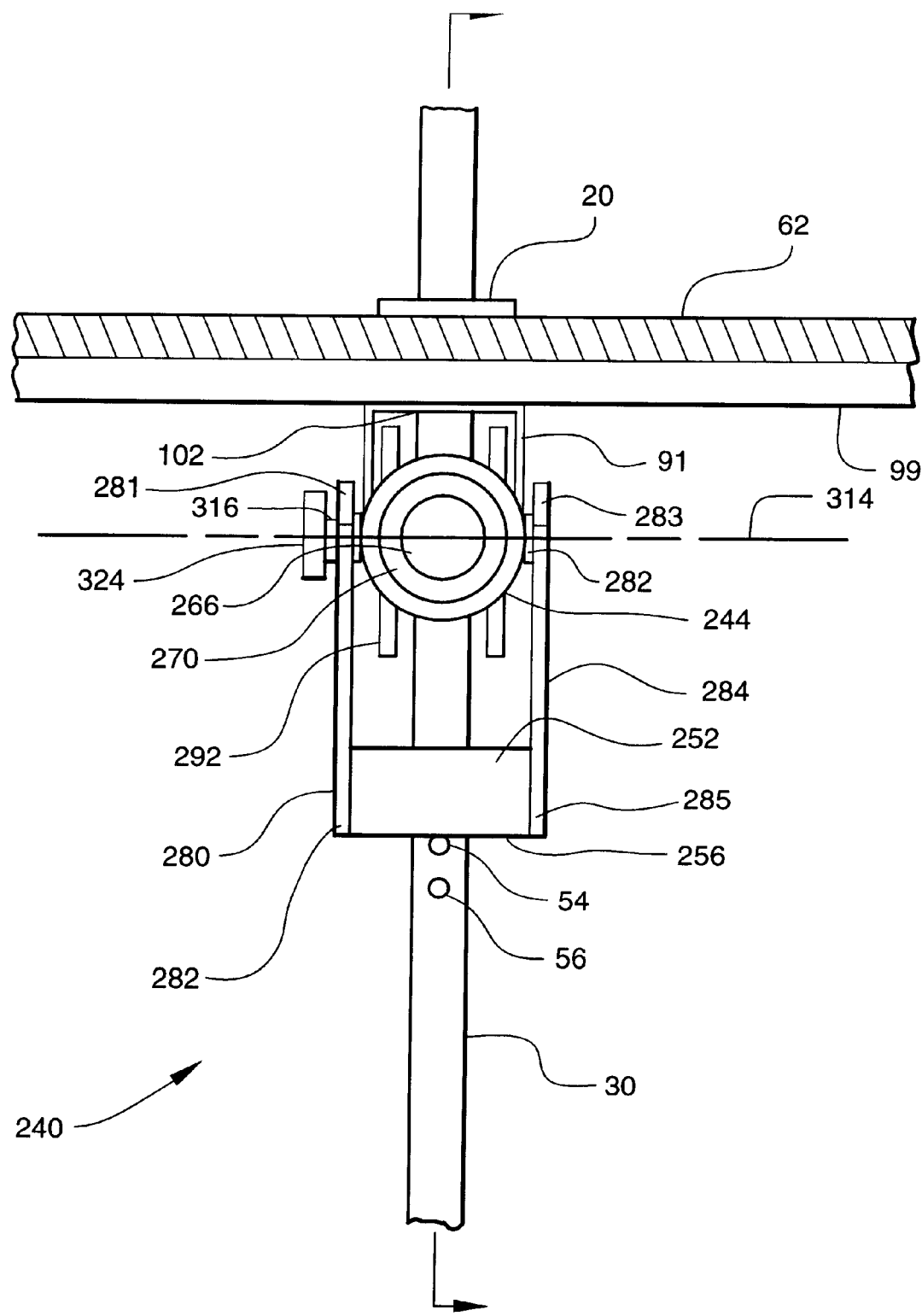
FIG. 11 is an end view of the latching assembly shown in FIG. 10.
Figure 14:
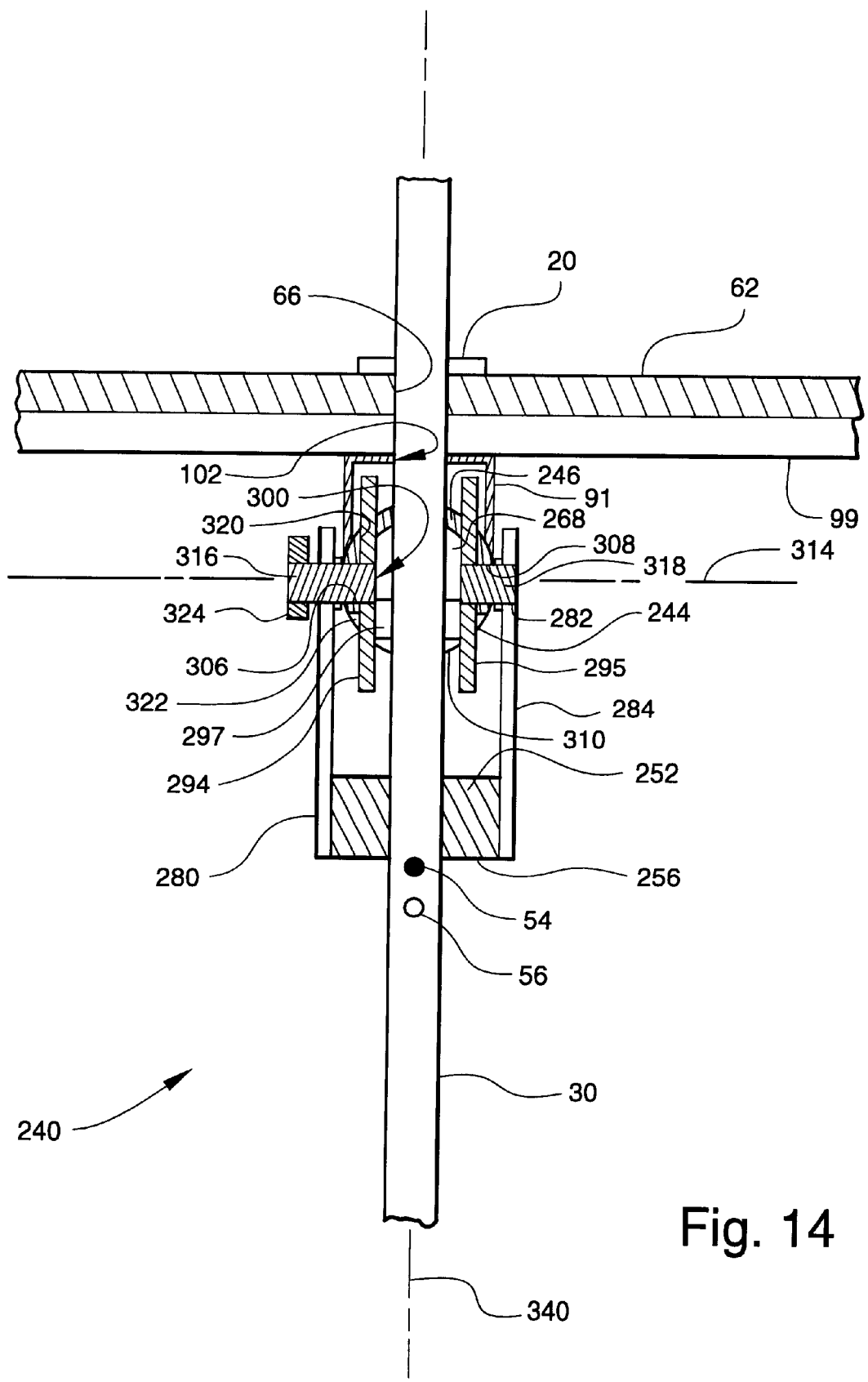
FIG. 14 is a cutaway end view of the latching assembly shown in FIG. 10.

Another embodiment of the equipment securing apparatus according to the present invention is illustrated generally at 210 in FIG. 9. As with the previous embodiments, the equipment securing apparatus 210 includes a shaft 30 and an engagement member 32. The shaft 30 has a shaft axis 340 and extends through an opening 66 formed in a vehicle body panel 62. A generally circular grommet 20 is attached to the opening 66 in the vehicle to seal around the circumference of the shaft 30 to prevent leakage into the interior 72 of the vehicle 60. As shown in FIG. 9, the securing apparatus 210 includes a latching assembly 240 attached to a support beam 91. The latching assembly 240 includes a cylindrical housing 244 (FIG. 10), a biasing arrangement 250 for applying a biasing force to the shaft 30 (FIG. 12), and a cam arrangement 290 (FIG. 12) to facilitate the operation of the biasing arrangement. As shown in FIGS. 10, 11 and 14, the support beam 91 is formed as a channel and is attached to the body panel 62 so that it spans two or more lateral roof beams 99. The support beam 91 includes a beam passageway 102 aligned with the opening 66 for receipt of the shaft 30.

Figure 12:
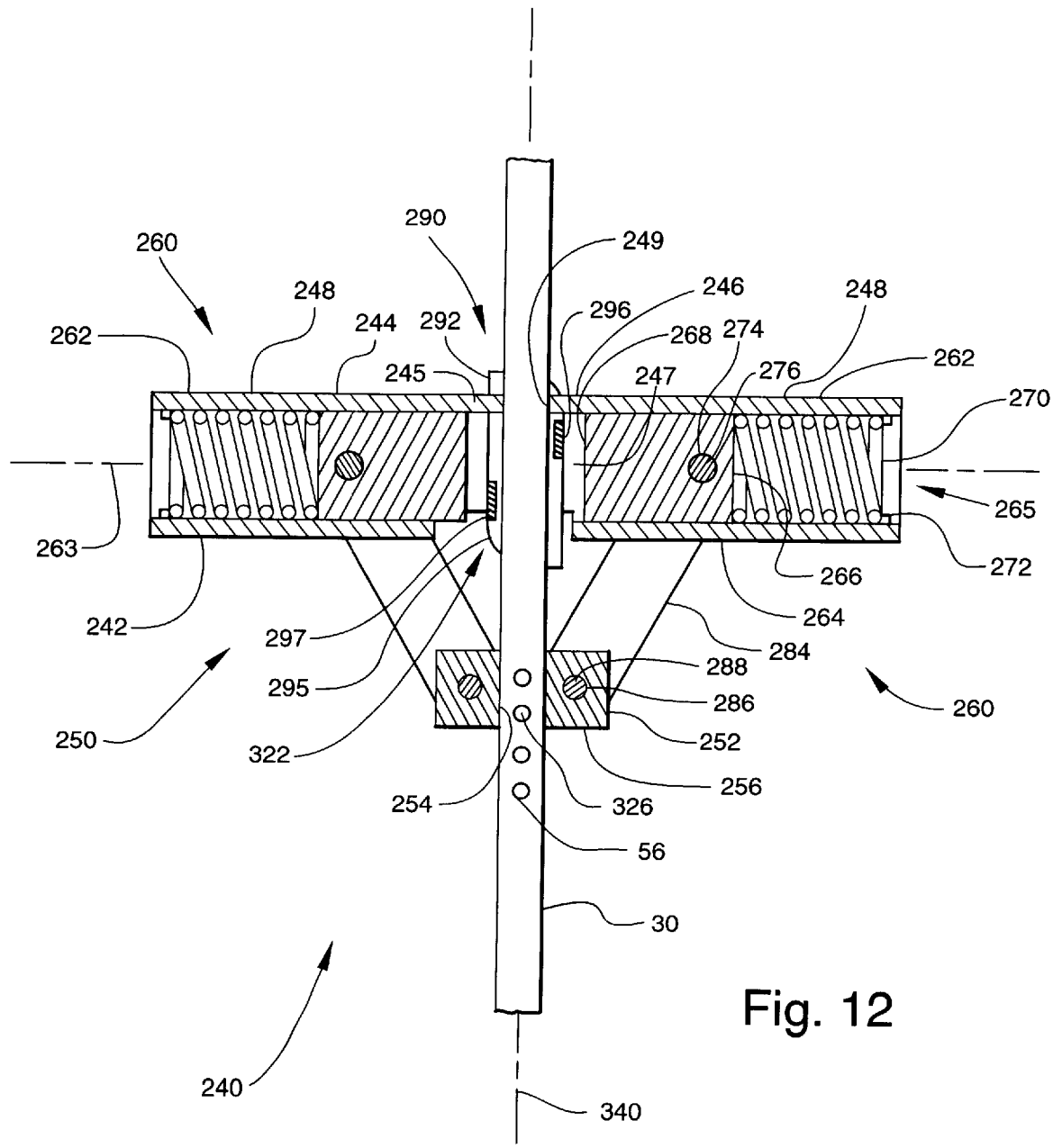
FIG. 12 is a cutaway side view of the latching assembly shown in FIG. 10 illustrating the cam arrangement in a non-engagement position.

Turning now to FIGS. 12 and 14, the cylindrical housing 244 of the latching assembly 240 is a tube-like member defining a pair of piston casings 248 and a support member 246. The support member 246 has a cylindrical wall 245 that defines a cam chamber 247 and an aperture 249 configured for slidable and rotatable disposition of the shaft 30 therethrough. The support member 246 also has a lower cam slot 322 through which the shaft 30 is disposed and which allows rotation of a cam assembly 292 as will be discussed in greater detail hereafter. The aperture 249 is in substantial alignment with the opening 66 and along with opening 66 retains and supports the shaft 30 so that lateral movement of the shaft 30 is prevented.

As noted above, the latching assembly 240 further includes a biasing arrangement 250 for retaining the shaft 30 in a condition where the engagement member 32 retains the equipment 70 in place. The biasing arrangement 250 includes a generally rectangular slide block 252, two piston assemblies 260 and two pairs of links 280, 284. The slide block 252 has a passageway 254 formed therethrough for slidable and rotatable receipt of the shaft 30. The slide block 252 is positioned so that the passageway 254 is in substantial alignment with the aperture 249 in the support member 246. The slide block 252 has a pin engagement surface 256 that engages a pin 54 inserted into one of the holes 56 in the shaft 30 as shown in FIG. 11.

The two piston assemblies 260 of the biasing arrangement 250 are arranged on opposing sides of the shaft 30. The piston assemblies 260 form a symmetric arrangement for providing a downward biasing force on the slide block 252. Each piston assembly 260 includes a cylindrical piston chamber 262 defined by one of the piston casings 248 and configured for slidable disposition of a piston 264 therein. Each piston chamber 262 is open at one end 265 and has a centerline that defines a piston movement axis 263. The two piston chambers 262 are arranged to be coaxial and are positioned so that their common piston movement axis 263 intersects the shaft axis 340 at a ninety-degree angle.

The piston 264 is slidably disposed within the piston chamber 262 for movement along the piston movement axis 263. The piston 264 has a spring engagement face 266 facing outward from the shaft 30 and a cam engagement face 268 facing the shaft 30. The spring engagement face 266 is configured for engaging a helical spring 270 positioned within the piston chamber 262 intermediate the piston 264 and a snap ring 272 positioned near the open end 265 of the piston chamber 262. The snap ring 272 provides a stationary thrust base for the spring 270.

Each piston 264 includes a piston shaft hole 274 formed therethrough for receipt of a piston shaft 276. Each of the two piston casings 248 has two diametrically opposing slots 278 (FIG. 10) formed therein which provide for passage of the piston shaft through the wall of the piston casing 248 on each side of the piston 264. The slots 278 extend along the piston casing 248 parallel to the piston travel axis 263 so that the piston shaft 276 can extend therethrough without interfering with the movement of the piston 264 within the piston chamber 262.

The slide block 252 includes two pivot shaft holes 286 formed therethrough with one on each side of the passageway 254. These pivot shaft holes 286 are substantially parallel to the piston shaft holes 274 and are each configured for receipt of one of two slide block pivot shafts 288. As shown in FIGS. 10, 11 and 12, each piston 264 is operatively connected to the slide block 252 by first and second links 280, 284, respectively, pivotally attached to a corresponding piston shaft 276 and slide block pivot shaft 288. It will be understood that FIG. 10 illustrates only the first link 280 for each piston, FIG. 12 illustrates only the second link 284 for each piston and FIG. 14 illustrates one pair of first and second links 280, 284. One end 281 of the first link 280 is pivotally attached to one end of a piston shaft 276, and the other end 282 of the first link 280 is pivotally attached to one end of a slide block pivot shaft 288. One end 283 of the second link 284 is pivotally attached to the opposite end of the piston shaft 276, i.e., opposite to the end of the piston shaft 276 attached to the first link 280, and the other end 285 of the second link 284 is pivotally attached to the opposite end of the slide block pivot shaft 288, i.e., opposite to the end of the slide block pivot shaft 288 attached to the first link 280. Washers 282 are used to space the links 280, 284 from the wall 245 of the housing 244.

In each piston assembly 260, the spring 270 engages the spring engagement face 266 of the piston 264, biasing the piston 264 toward the shaft 30. The piston 264 transfers the biasing force through the links 280, 284 to the slide block 252, thus biasing the slide block 252 downward against the pin 54 as shown in FIGS. 10 and 11. The pin 54, in turn, transmits the biasing force to the shaft 30, thus biasing the engagement member 32 against the equipment 70, securing it to the vehicle 60. The biasing forces on the pin 54 and shaft 30 can be removed by forcing the pistons 264 to move outward away from the shaft 30. This causes the slide block 252 to move upward, thus lessening or removing the force applied to the pin 54. The amount of relative movement of the slide block 252 and the pistons 264 within a typical operating range of piston movement may be varied by, for example, changing the length of links 280, 284 or by changing the point of connection of the links 280, 284 to the slide block 252 or pistons 264. An illustrative ratio is 0.75 inch of piston movement to 1.0 inch of slide block movement.

It will be understood by those having ordinary skill in the art that a single piston assembly 260 can be used without departing from the spirit and scope of the present invention. However, the use of two piston assemblies 260 arranged symmetrically about the shaft 30 reduces the size of the spring 270 necessary to maintain the required biasing force. The symmetry also helps to maintain alignment of the slide block shaft passageway 254 with the support member aperture 249 so that the shaft 30 may be easily slid through both the slide block shaft passageway 254 and the support member aperture 249. Further, the configuration symmetry serves to maintain symmetry of the forces required to engage and disengage the biasing arrangement 250 from the pin 54 and the shaft 30.

In the embodiment illustrated in FIG. 12, movement of the pistons 264 away from the shaft 30 is resisted by the springs 270. In order to force the pistons 264 apart, the latching assembly 240 includes a cam arrangement 290. The cam arrangement 290 provides for controlled movement of the pistons 264 for engagement and disengagement of the biasing arrangement 250 with the shaft 30.

Figure 13:
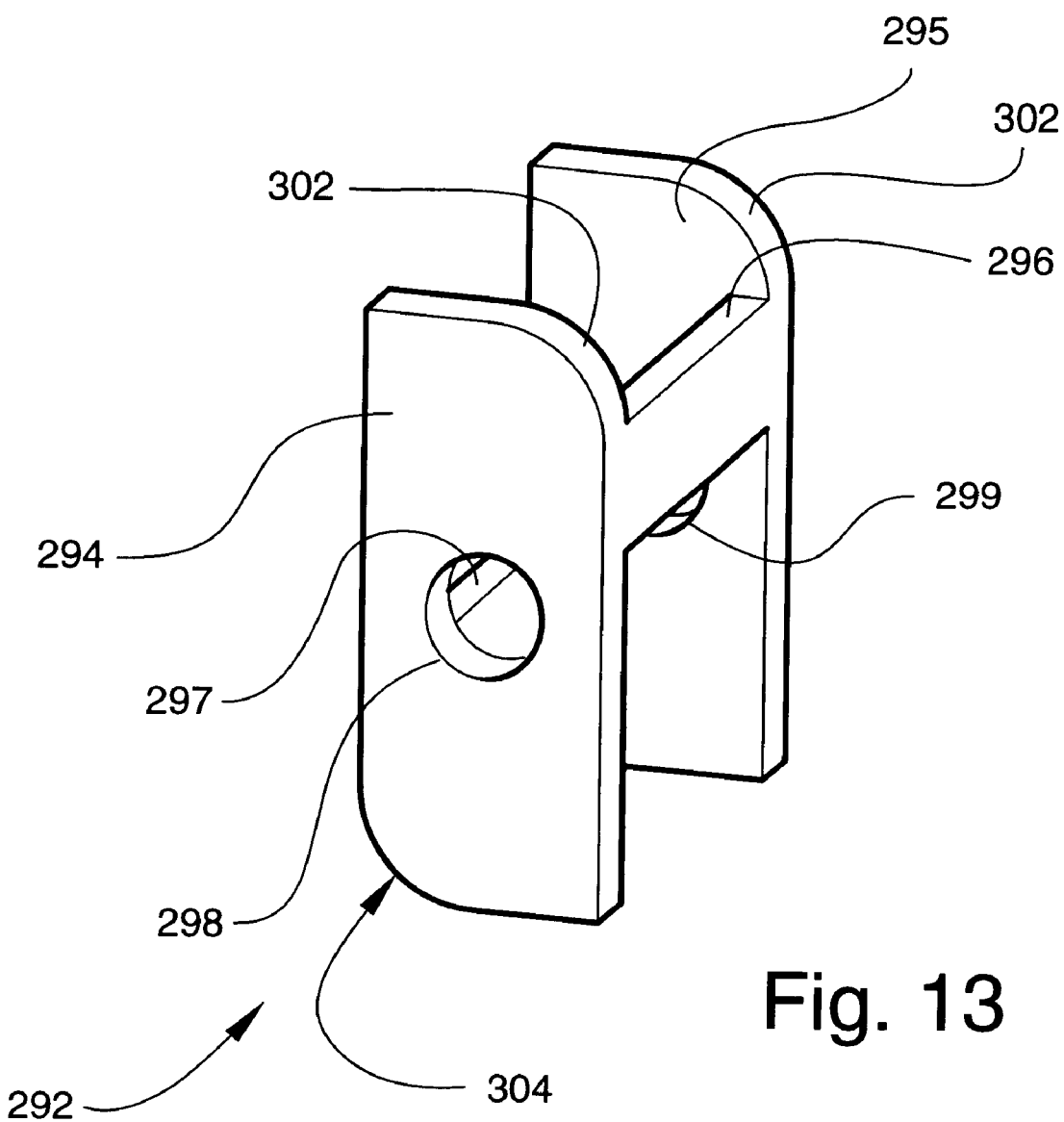
FIG. 13 is a perspective view of a cam arrangement according to the present invention.

The cam arrangement 290, includes a cam assembly 292 pivotally attached to the support member 246. The cam assembly 292, illustrated in FIG. 13, includes a pair of spaced apart cams 294, 295 joined by two cross-members 296, 297. The first cam 294 has a first camshaft hole 298 formed therethrough and the second cam 295 has a second camshaft hole 299 formed therethrough. The cam assembly 292 is configured so that the first and second camshaft holes 298, 299 are substantially aligned with each other. Both cams 294, 295 have a first piston engagement surface 302 that is configured for engagement with the cam engagement face 268 of one of the two pistons 264 and a second piston engagement surface 304 that is configured for engagement with the cam engagement face 268 of the other piston 264. The cam assembly 292 may be formed as an integral unit and may be machined from a single block of material.

Turning now to FIG. 14, the support member 246 includes third and fourth camshaft holes 306, 308. The third and fourth camshaft holes 306, 308 are configured and placed so that they are diametrically opposed and substantially in alignment. The coaxial centerlines of the third and fourth camshaft holes 306, 308 define a camshaft axis 314. The third and fourth camshaft holes 306, 308 are positioned so that the camshaft axis 314 intersects the piston movement axis 263 and the shaft axis 340 at ninety-degree angles.

The cam assembly 292 is positioned within the cam chamber 247 so that the first camshaft hole 298 is substantially aligned with the third camshaft hole 306 thereby forming a first camshaft passageway 300 through the first and third camshaft holes 298, 306. The cam assembly 292 is also positioned so that the second camshaft hole 299 is substantially aligned with the fourth camshaft hole 308 thereby forming a second camshaft passageway 310. The first and second camshaft passageways 300, 310 are substantially in alignment with each other.

The cam arrangement 290 further includes first and second camshafts 316, 318 configured for receipt by the first and second camshaft passageways 300, 310, respectively. The camshafts 316, 318 remain free to rotate within the third and fourth camshaft holes 306, 308 but are fixed within the first and second holes 298, 299 of the cam assembly 292 so that the cam assembly 292 and camshafts 316, 318 rotate as a unit.

The support member 246 includes two upper cam slots 320 and a lower cam slot 322, which extend through the support member wall 245. The cam slots 320, 322 are configured to allow passage of portions of the cams 294, 295 through the wall 245 when the cam assembly 292 is rotated. This allows the cam assembly 292 to be freely rotated without interference by the wall 245 of the support member 246. The upper cam slots 320 are configured to limit the rotation of the cam assembly 292 to a point where the cams 294, 295 are roughly parallel with the shaft 30. It will be appreciated by those having ordinary skill in the art that if the inside diameter of the cylindrical housing 244 is sufficiently large, the cam slots 320, 322 would be unnecessary for preventing interference by the wall 245.

Figure 15:
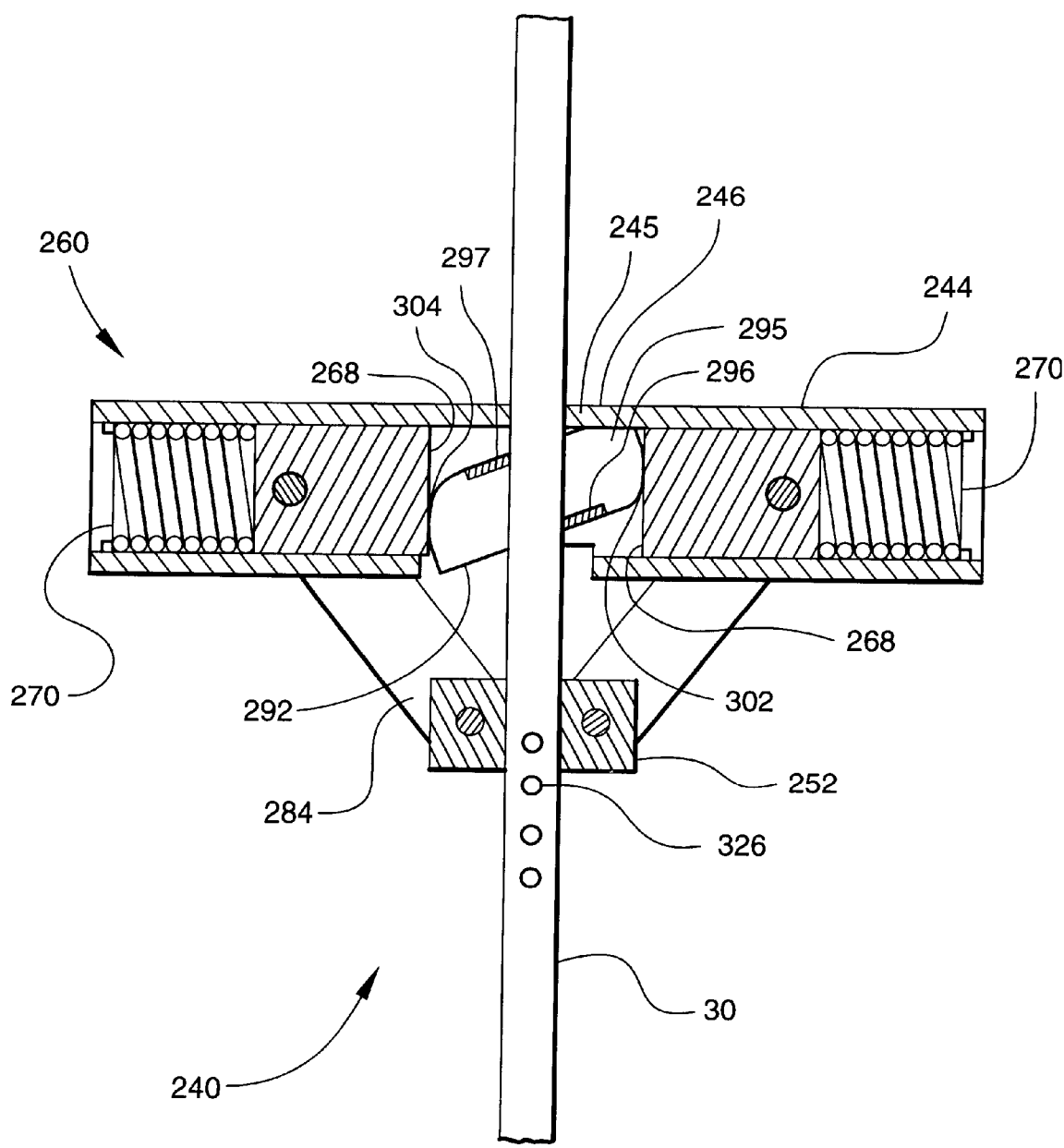
FIG. 15 is a cutaway side view of the latching assembly shown in FIG. 10 illustrating the cam arrangement in engagement with the pistons of the piston assemblies.

As shown in FIG. 15, the cam assembly 292 is configured to rotate to cause the cams 294, 295 to engage the pistons 264. It will be understood that although only the second cam 295 is illustrated in FIG. 15, the first cam 294 is positioned and operates in the same manner. The first piston engagement surfaces 302 of the cams 294, 295 engage the cam engagement face 268 of one of the pistons 264 while the second piston engagement surfaces 304 substantially simultaneously engage the cam engagement face 268 of the other piston 264. Further rotation of the cam assembly 292 after engagement causes the pistons 264 to be forced outward, thereby causing the slide block 252 to move upward. The cam assembly 292 may then be rotated in the opposite direction to allow the springs 270 to force the pistons 264 toward the shaft 30, thereby lowering the slide block 252 for engagement and loading of the pin 54.

To facilitate the rotation of the cam assembly 292, an elongate control arm 324 is attached at one end to the first camshaft 316 as shown in FIG. 10. The control arm 324 provides leverage for rotating the cam assembly 292 and forcing the pistons 264 outward against the biasing force of the springs 270. The control arm 324 is attached to the first camshaft 316 at an orientation that allows the control arm 324 to be rotated through at least ninety degrees without interference from the vehicle body panel 62. The control arm 324 is preferably attached so that it is generally parallel to the piston movement axis 263 when the cam assembly 292 is in the non-engagement position illustrated in FIG. 10.

The force required to move the pistons 264 outward is a nonlinear function of the compression of the springs 270. The amount of force required thus increases as the pistons 264 move outward. The piston engagement surfaces 302, 304 of the cams 294, 295 and the cam engagement faces 268 of the pistons 264 are configured to counter this effect by providing an engagement profile that changes the amount of leverage applied by the control arm 324 as the cam assembly 292 is rotated. The effect is that the force that must be applied to the control arm 324 by the user is more nearly constant. It will be understood by those skilled in the art that the engagement profile may be varied by changing the curvature of the piston engagement surfaces 302, 304, providing curved cam engagement faces 268 or both changing the curvature of the engagement surfaces 302, 304 and providing curved cam engagement surfaces 268.

In operation, the equipment 70 to be secured is applied to the ladder rack 68 and the shaft 30 manipulated to position the engagement member 32 as in the previous embodiments. Once the equipment 70 and the engagement member 32 are in position, the shaft 30 is in a condition wherein a selected opening 326 in the shaft 30 is positioned between the pin engagement surface 256 of the slide block and the lower cam slot 322 of the support member 246 as shown in FIG. 12.

The control arm 324 is then rotated as illustrated at arrow 328 in FIG. 10. This causes the cam assembly 292 to rotate into engagement with the pistons 264. The control arm 324 is then further rotated, thereby causing the slide block 252 to move upward relative to the shaft 30 as shown in FIG. 15. The movement of the slide block 252 results in the positioning of the selected opening 326 below the pin engagement surface 256 of the slide block 252. A pin 54 is then inserted into the selected opening 326 and the control arm 324 is released. This allows the springs 270 to force the pistons 264 inward toward the shaft 30 so that the slide block 252 engages the pin 54. The pistons 264 continue to move until the equipment engagement member 32 is in a full engagement condition with the equipment 70. The biasing force of the springs 270 maintain this engagement condition until the control arm 324 is rotated to disengage the slide block 252 from the pin 54.

For convenience and overall compactness, it is desirable that the control arm 324 be held in a stowed configuration wherein the control arm 324 is substantially parallel to the piston movement axis 263 when it is not being used to engage or disengage the biasing arrangement 250. This stowed configuration is illustrated in FIG. 10.

Figure 16:
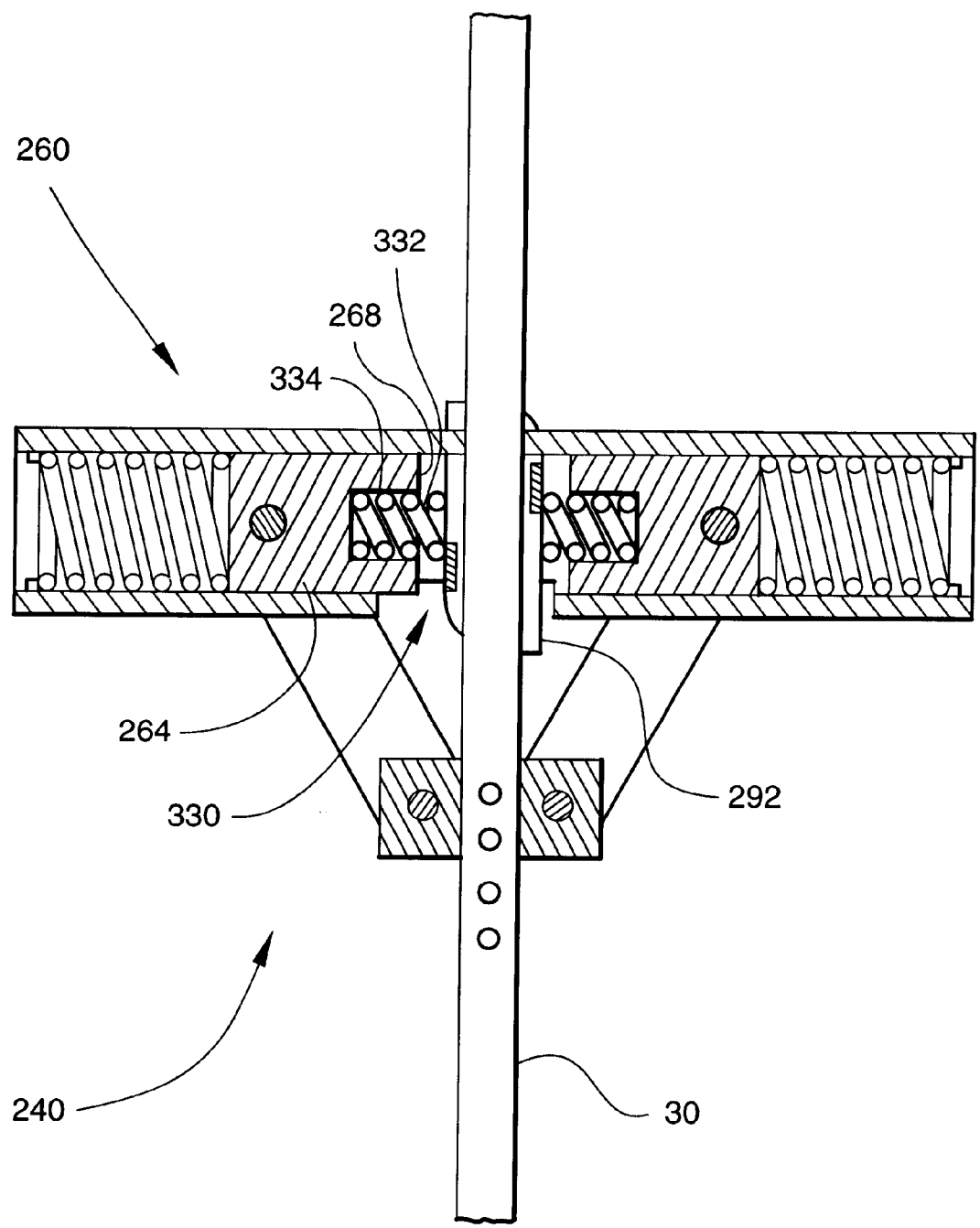
FIG. 16 is a side view of another latching assembly of an equipment securing apparatus according to the present invention.

The embodiment illustrated in FIG. 16 includes an arrangement 330 for biasing the cam assembly 292 in a non-engagement position. The cam biasing arrangement 330 includes cam return springs 332 disposed between the pistons 264 and the cams 294, 295. In this embodiment, each piston 264 includes a spring pocket 334 formed adjacent the cam engagement face 268 and configured for receipt of a cam return spring 332. The spring pockets 334 are located and the cam return springs 332 are configured to apply a restoring moment to the cam assembly 292 to bias it in a non-engagement position wherein the cams 294, 295 are held against the limiting edges of the upper cam slots 320.

The control arm 324 (not shown in FIG. 16) of this embodiment is attached to the first camshaft 316 so that it is parallel to the piston movement axis 263 when the cam assembly 292 is in this non-engagement position. Thus, when the control arm 324 is released after use, the cam return springs 332 cause the cam assembly 292 to rotate to bring the control arm 324 into its stowed configuration. It will be understood by those skilled in the art that additional springs and other spring configurations may be used to bias the cam assembly 292 to a non-engagement position without departing from the scope of the present invention.

The cylindrical housing 244 of the securing apparatus 210 is attached to the support beam 91 using clamps 336 as shown in FIG. 10. It will be understood that almost any type of clamp with a cross section that will fit between the support beam 91 and the vehicle body panel 62 is suitable for use in this invention. The support beam 91 is sized so that the channel edges 338 will contact the housing 244 between the upper cam slots 320 and the third and fourth camshaft holes 306, 308 as shown in FIG. 14.

The support beam 91 may have a plurality of beam passageways 102 arranged along its length and aligned with a plurality of panel openings 66. This would permit variable positioning of the other components of the apparatus so that the shaft 30 and engagement member 32 could be used to hold equipment positioned anywhere on the rack 68. Unused panel openings 66 would be sealed to prevent access to the interior.

Figure 17:
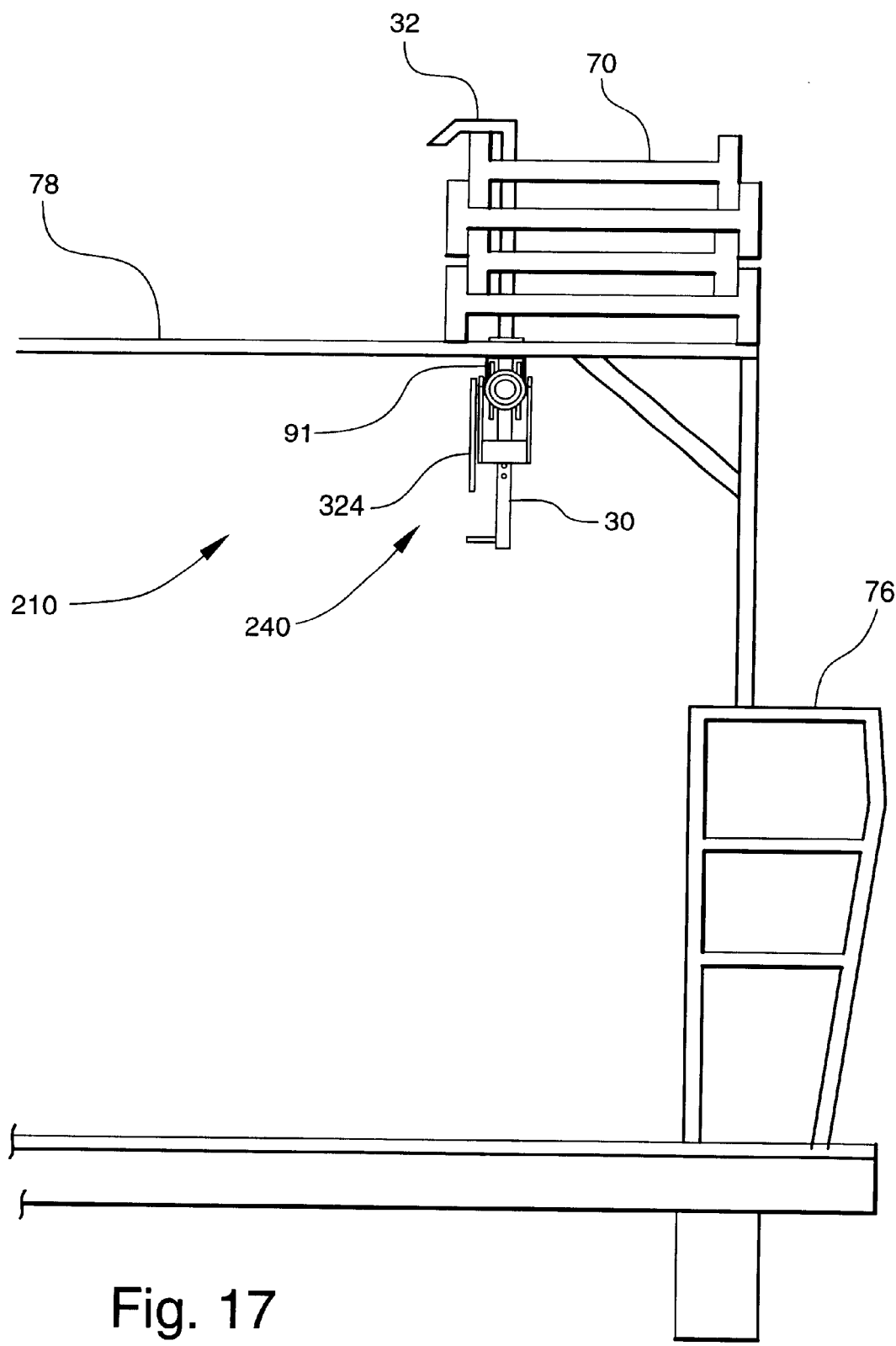
FIG. 17 is an end view of an open vehicle illustrating an equipment securing apparatus according to another embodiment of the present invention.
Figure 18:
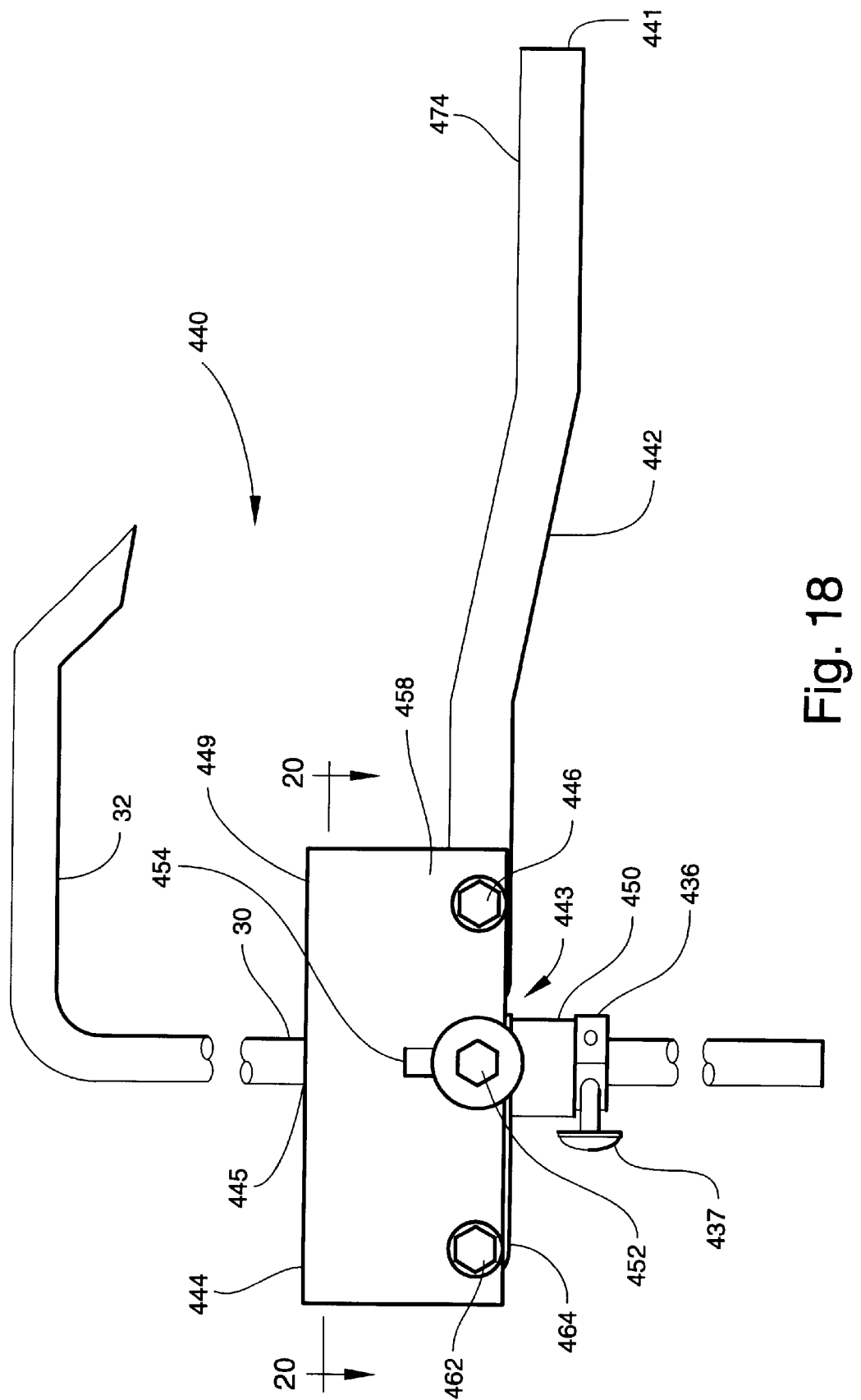
FIG. 18 is a front view of a securing apparatus according to the present invention.
Figure 19:
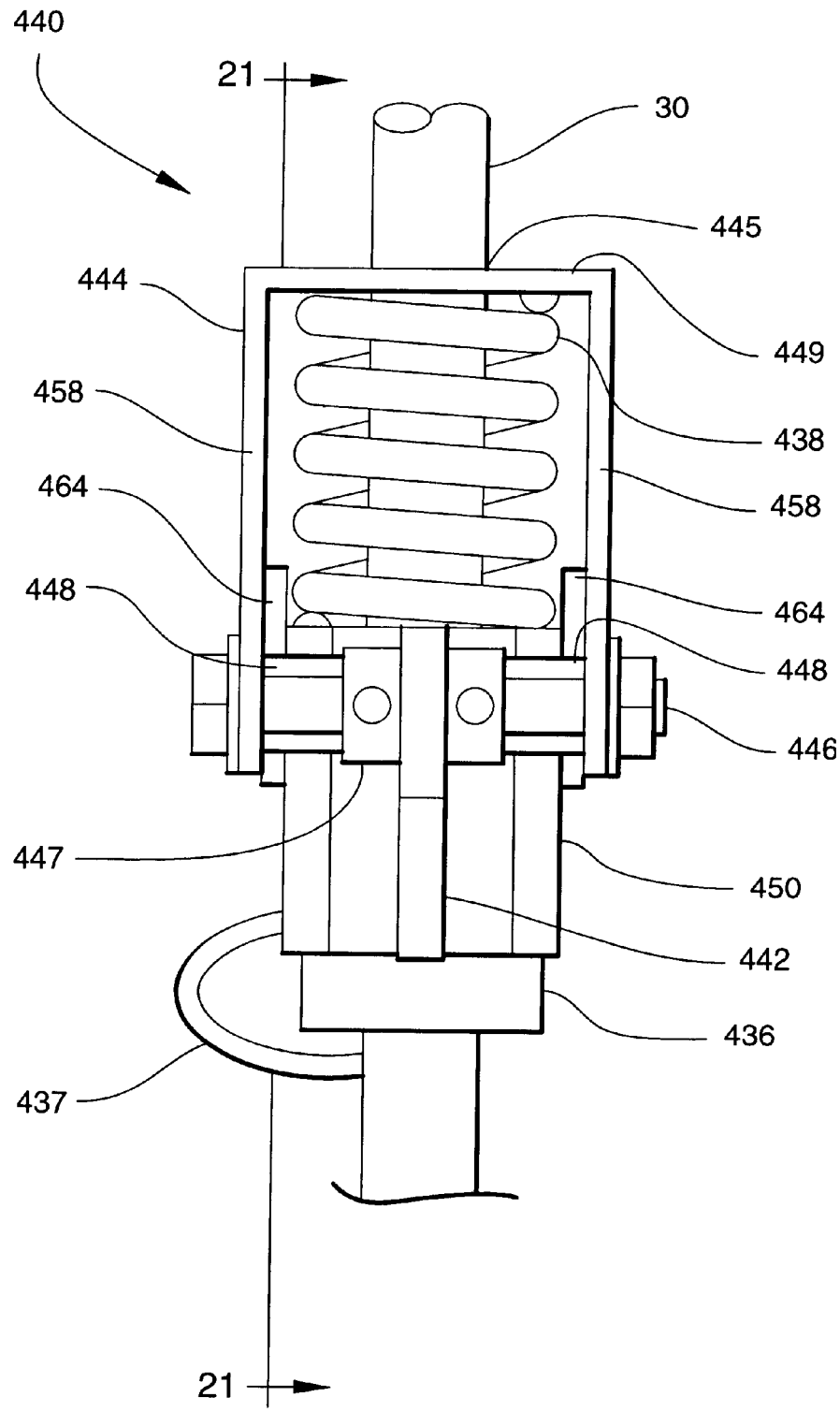
FIG. 19 is an end view of the latching assembly of the securing apparatus of FIG. 18.

Another embodiment of the present invention is illustrated in FIG. 17. There, an open vehicle 76, such as a pick-up truck is illustrated in diagrammatic form. The open vehicle 76 includes a ladder rack 78 carrying a plurality of ladders 70. Other types of equipment may also be carried on the rack 78. As shown in FIG. 17, the support beam 91 of the equipment securing apparatus 210 is attached to the ladder rack 78. It will be understood that the support beam 91 may be attached to any fixed portion of the vehicle and that the equipment securing device 210 may be oriented at any angle including horizontally. The latching assembly 240 remains the same as in prior embodiments and is operated in a similar manner to secure the ladders 70 or other equipment to the rack 78.

In yet another embodiment of the present invention, a securing apparatus 410 includes a more compact latching assembly 440 for use in conjunction with shaft 30 and engagement member 32 as shown in FIGS. 18–28. The latching assembly 440 includes a channel-shaped housing 444 having two side walls 458 and an upper wall 449. The upper wall 449 has a passage 445 for slidable and rotatable disposition of the shaft 30 therethrough. The upper wall 449 thus acts as a support member for the shaft 30. The latching assembly 440 uses a slider/spring support member 450 to transfer a biasing force from a spring 438 to the shaft 30 to maintain engagement of the engagement member 32 with equipment to be secured. As will be discussed in more detail hereafter, the latching assembly 440 uses a novel cam arrangement to transfer rotational movement of a control arm 442 into movement of the slider/spring support member 450 to compress the spring 438, thereby preparing the latching assembly 440 for transfer of the biasing force of the spring 438 to the engagement member 32.

Figure 20:
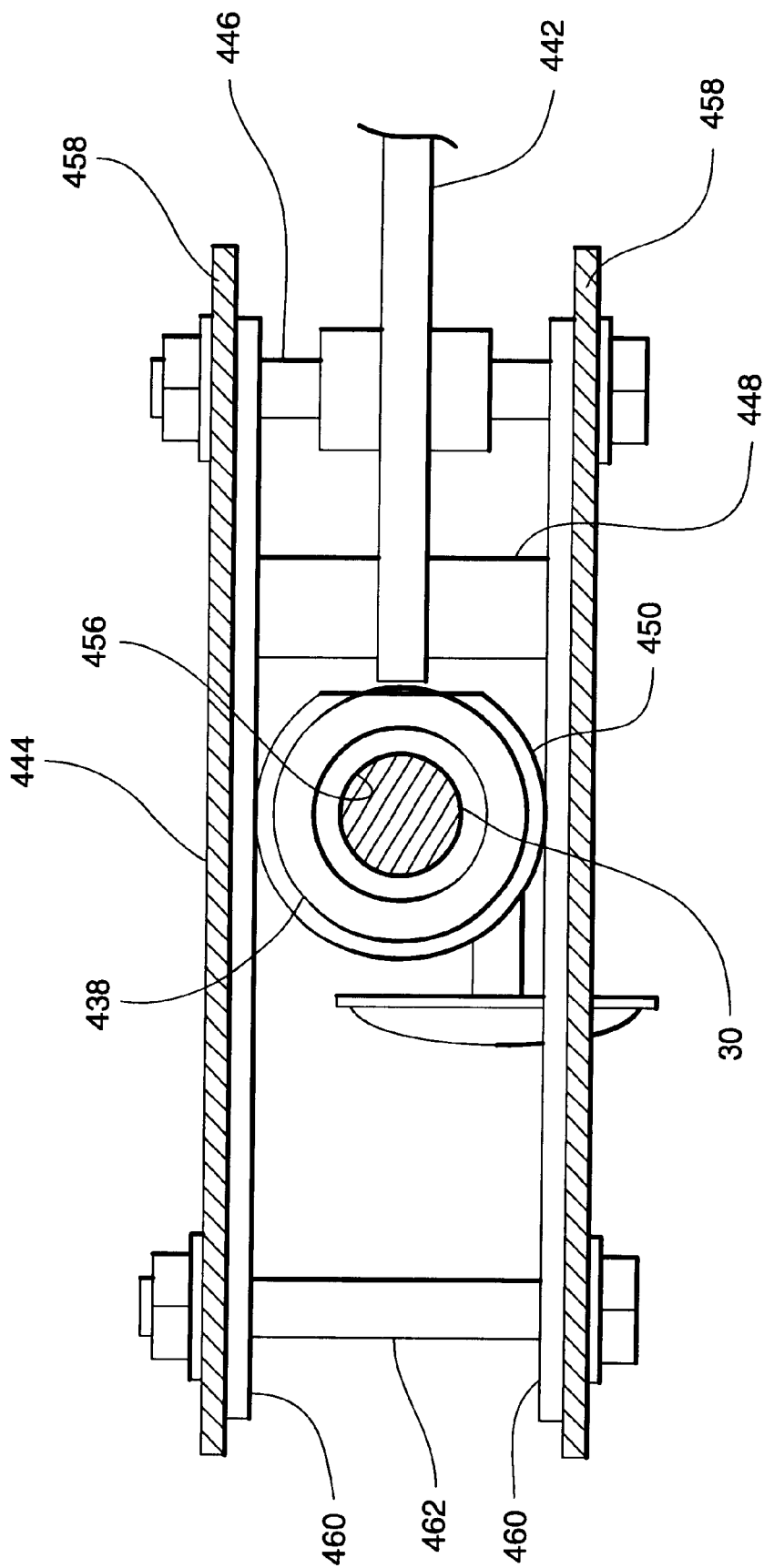
FIG. 20 is a sectional top view of the latching assembly of the securing apparatus of FIG. 18.

The slider/spring support member 450 is formed from a generally cylindrical block. As best seen in FIG. 20, one side of the slider/spring support member 450 is flattened to provide clearance for the rotation of the control arm 442, which is discussed in more detail below. It will be understood by those having ordinary skill in the art that the slider/spring support 450 could be a full cylinder or other geometry without departing from the scope of the present invention. The depicted geometry, however, provides for a simple, compact mechanism that is easily machined. The slider/spring support member 450 has a slider passage 456 formed therethrough for slidable and rotatable disposition of the shaft 30. A pair of diametrically opposed slider guide rods 452 are attached to the slider/spring support member 450. The slider guide rods 452 extend outward through guide slots 454 formed in the side walls 458 of the housing 444. The slider guide rods and preferably bolts or machine screws that are mated to threaded holes formed in the slider/spring support member 450. The combination of the guide rods 452 and guide slots 454 prevents lateral motion of the slider/spring support 450 while allowing axial motion of the slider/spring support 450.

The latching assembly 440 includes a helical spring 438 disposed around shaft 30 intermediate the slider/spring support member 450 and the upper wall 449 of the housing 444. The latching assembly 440 also includes a locking collar 436 that is essentially a ring-like clamp with a cylindrical passage through which the shaft 30 is slidably disposed. The locking collar 436 has a knobbed machine screw 437 that allows the locking collar 436 to be selectively fixed in place on the shaft 30 or loosened by hand turning of the knob. The locking collar 436 can either be permanently attached to the underside of the slider/spring support member 450 or can be allowed to slide along the shaft 30 independently of the slider/spring support member 450. The effect of these two options on operation of the securing apparatus 410 is discussed below. The locking collar 436 can also be integrally formed with the slider/spring support member 450 so as to form a portion of the slider passage 456.

Figure 21:
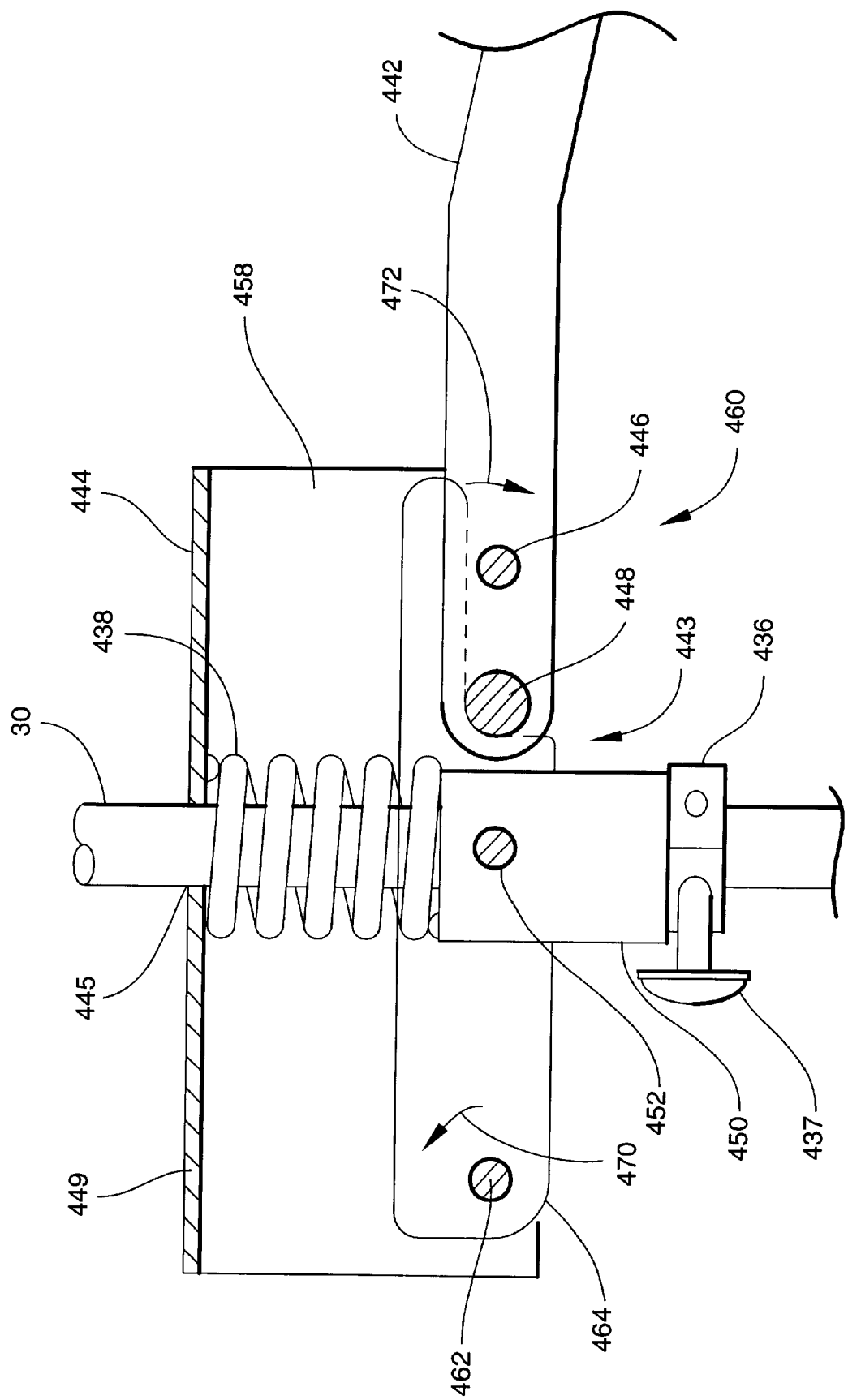
FIG. 21 is a sectional front view of the latching assembly of the securing apparatus of FIG. 18.

When the spring 438 is at least partially compressed between the slider/spring support member 450 and the upper wall 449 of the housing 444, tightening the locking collar 436 to the shaft 30 in the position shown in FIG. 21 allows the biasing force of the spring 438 to be transmitted through the slider/spring support 450 and the locking collar to the shaft 30. Thus, in the latched configuration shown in FIG. 21, the shaft 30 and the engagement member 32 are biased downward. This, in turn, biases the engagement member 32 in engagement with any equipment to be secured.

It will be understood by those having ordinary skill in the art that other mechanisms may be used to transfer the biasing force from the slider/spring support 450 to the shaft 30, including the previously described use of a locking pin in conjunction with spaced holes disposed along the shaft 30. Conversely, the locking collar arrangement could be used in place of the locking pin arrangement in the previous embodiments.

The spring 438 is configured to provide a biasing force that is high enough to hold equipment in place, but low enough that it can be overcome using the leverage of the spring compression control mechanism 460 discussed below. It will be understood by those having ordinary skill in the art that multiple concentric helical springs may be used in place of a single spring 438.

Figure 22:
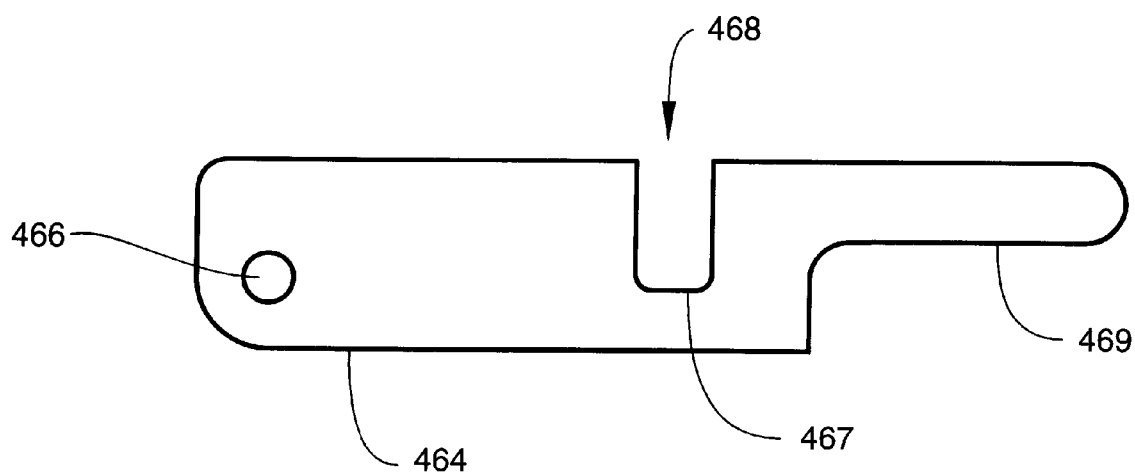
FIG. 22 is a side view of a cam lever arm of a latching assembly of the securing apparatus of FIG. 18.
Figure 23:
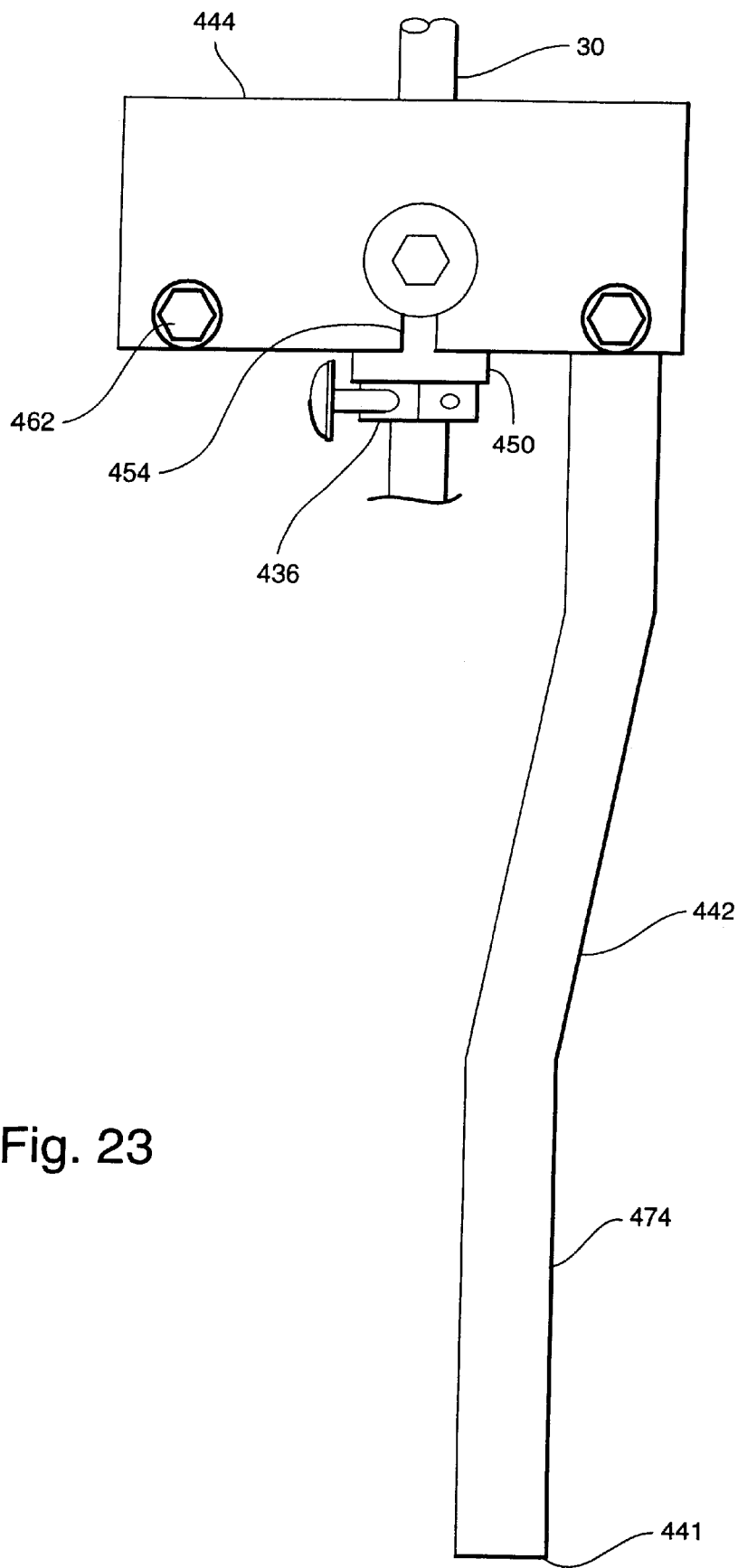
FIG. 23 is a front view of the latching assembly of the securing apparatus of FIG. 18 with the control arm in its maximum spring compression position.
Figure 24:
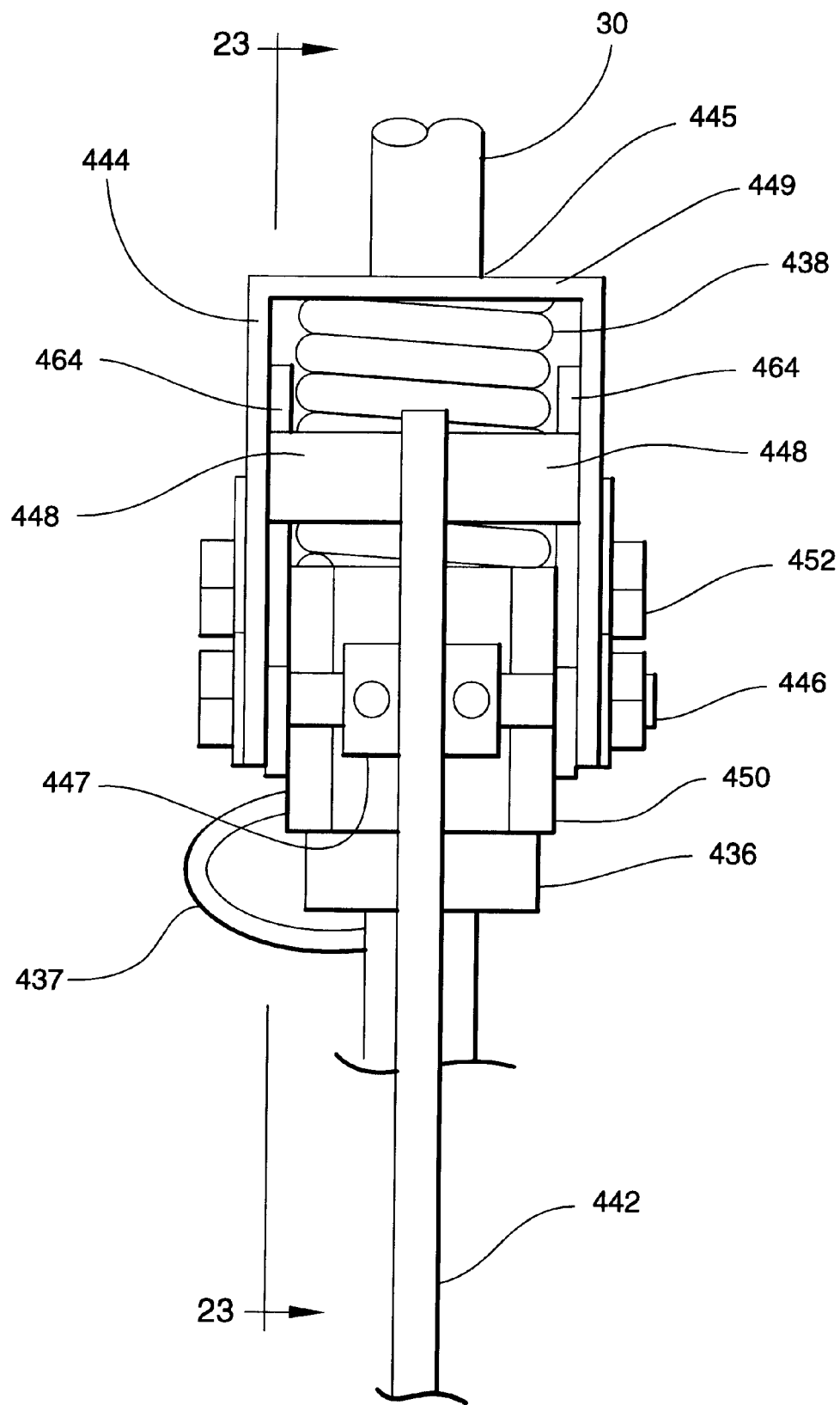
FIG. 24 is an end view of the latching assembly of the securing apparatus of FIG. 18 with the control arm in its maximum spring compression position.

The latching assembly 440 includes a spring compression control mechanism 460 for selectively forcing the slider/spring support member 450 toward the upper housing wall 449 against the resistance of the spring 30. The spring compression mechanism 460 includes a pair of cam lever arms 464 pivotally attached to the housing side walls 458 by cam lever pivot shaft or bolt 462. The cam lever arms 464 are positioned adjacent the inside surfaces of the side walls 458 on opposing sides of the shaft 30 and spring 438. As shown in FIG. 22, each cam lever arm 464 includes an aperture 466 for disposition of the pivot shaft 462, a slot 468 for accommodation of the slider guide rod 452 and a cam-riding surface 469. It will be understood by those having ordinary skill in the art that when the cam lever arms 464 are rotated in the direction illustrated at 470 in FIG. 21, the base portion 467 of the slot 468 of each cam lever arm 464 will engage the slider guide rod 452. If the rotation is continued, the guide rod 452 and the slider/spring support member 450 will be forced to move toward the upper housing wall 449. The slot 468 is configured so as to permit the slider guide rod 452 to slide along the flattened base portion 467 as the cam lever arm 464 is rotated, thereby minimizing the tendency for the guide rod 452 to bind and prevent easy manipulation of the control arm 442.

The spring compression mechanism 460 further includes an elongate control arm 442 with a distal end 441 and a proximal end 443. The control arm 442 is mounted to a control arm pivot shaft 446 so that the control arm 442 may be rotated between a first position (shown in FIGS. 18–21) and a second position (shown in FIGS. 23–25). The control arm 442 is held in the center of the pivot shaft by a pair of locking collars 447. The control arm 442 is configured so that the pivot shaft is spaced outward from the distal end 443. The control arm 442 includes a handle section 474 that is offset slightly to facilitate gripping of the control arm 442 when the latching assembly 440 is closely spaced to a structure such as a vehicle roof or support beam.

A pair of cylindrical cam rollers 448 are attached to the control arm 442 near the distal end 443. The cam rollers 448 are mounted to the control arm 442 so that they can rotate freely. When the control arm 442 is rotated, the cam rollers 448 engage the cam bearing surfaces 469 of the cam lever arms 464. As this rotation is continued, the cam rollers 448 rotate and roll along the cam bearing surfaces 448. The cam rollers 448 can be formed from any high strength, wear resistant material including high density polyurethane, steel or nylon. It will be understood by those having ordinary skill in the art that if the cam rollers 448 are formed from a low friction material such as Teflon, the cam rollers 448 could alternatively be fixed to the control arm 442 so that they would slide along the cam bearing surfaces 448 rather than roll.

Figure 25:
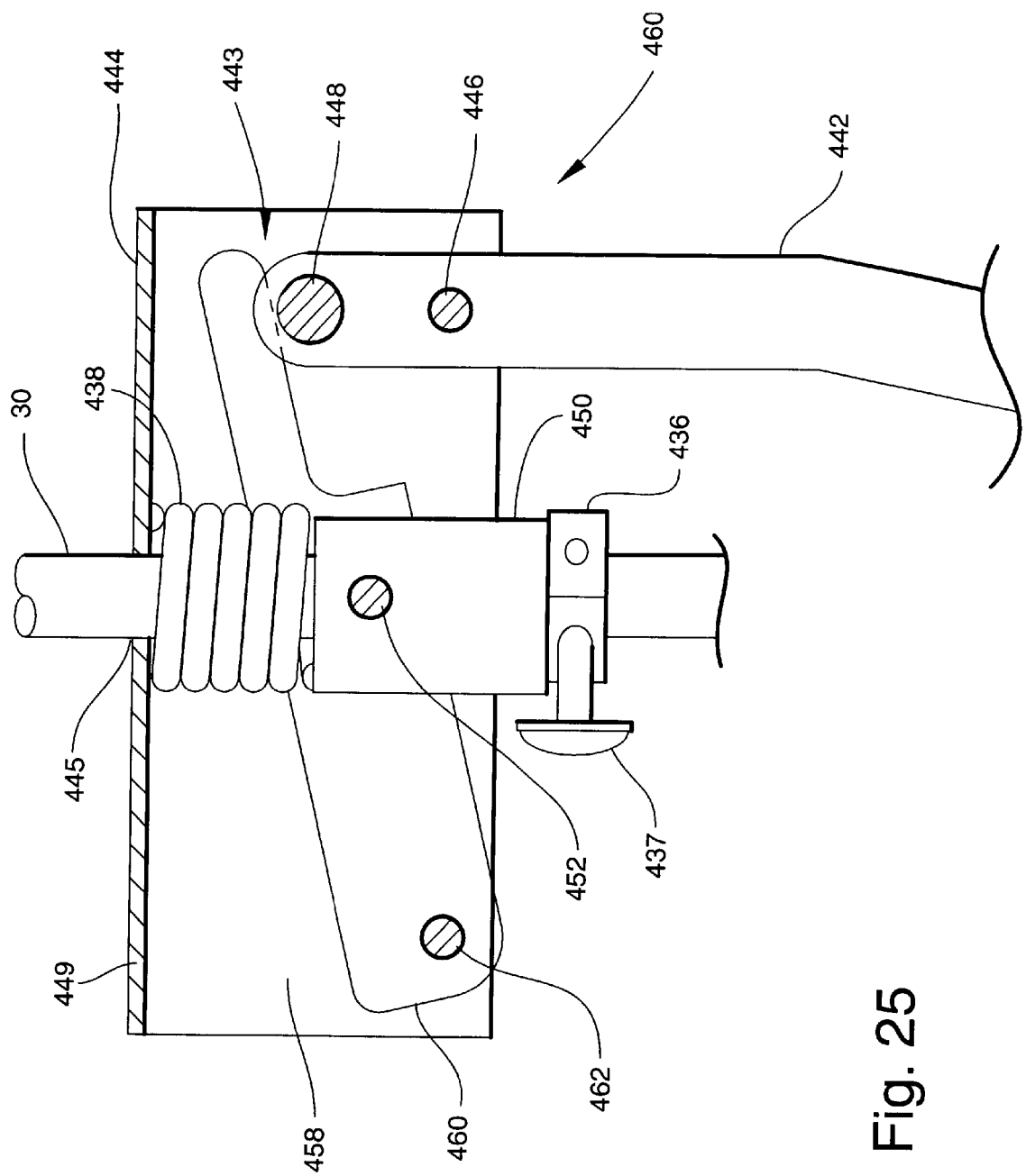
FIG. 25 is a sectional front view of the latching assembly of the securing apparatus of FIG. 18 with the control arm in its maximum spring compression position.

When the control arm 442 is rotated in the direction indicated at 472 in FIG. 21, the cam rollers 448 engage the cam-riding surfaces 469 of the cam lever arms 464. As the rotation is continued, the cam rollers 448 slide (or roll) along the cam-riding surfaces 469 and force the rotation of the cam lever arms 464 in the direction of 470, which, in turn causes the movement of the slider/spring support 450 toward the upper housing wall 449 and the compression of the spring 438. The cam lever arms 464 reach their maximum rotation when the control arm 442 has been rotated approximately 90 degrees as shown in FIG. 25. This position also represents the maximum travel of the slider/spring support 450 and the maximum compression of the spring 438. The cam lever arms 464 and the cam rollers 448 are sized in combination to produce a desired deflection of the cam lever slot base 467 and, accordingly, the length of travel of the slider/spring support member 450.

Figure 26:
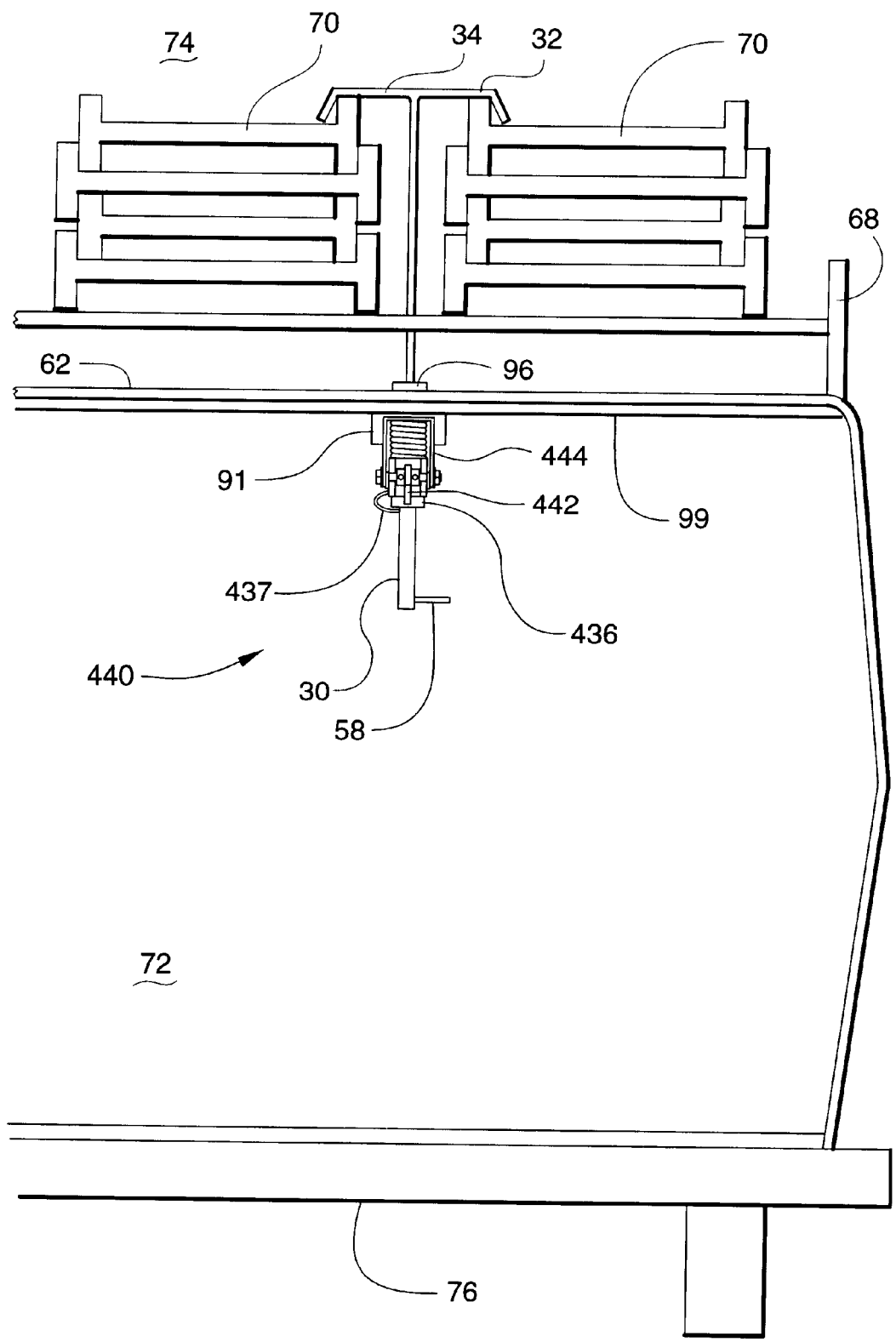
FIG. 26 is an end view of a closed vehicle with the equipment securing apparatus of FIG. 18 installed therein.
Figure 27:
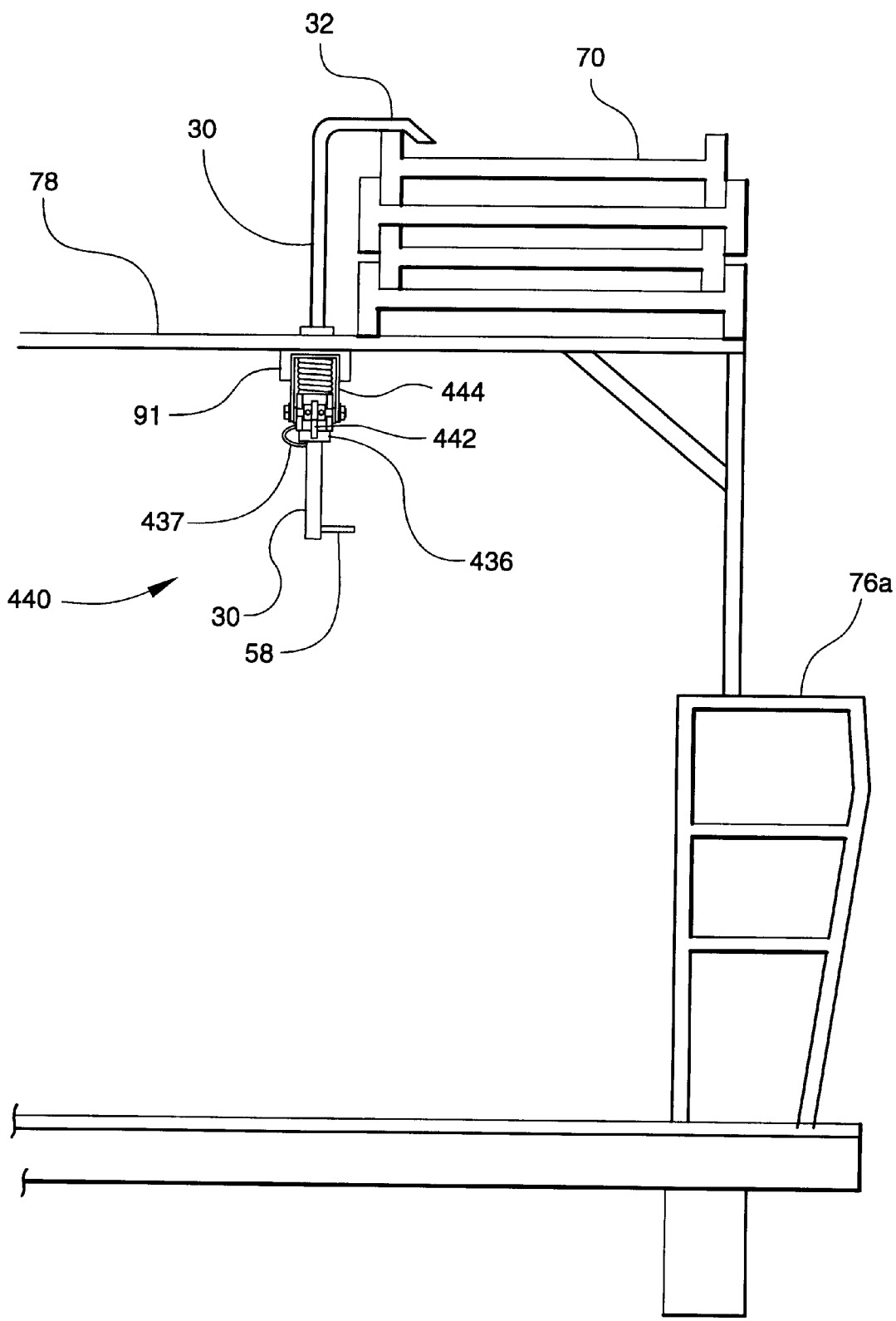
FIG. 27 is an end view of an open vehicle with the equipment securing apparatus of FIG. 18 installed therein.
Figure 28:
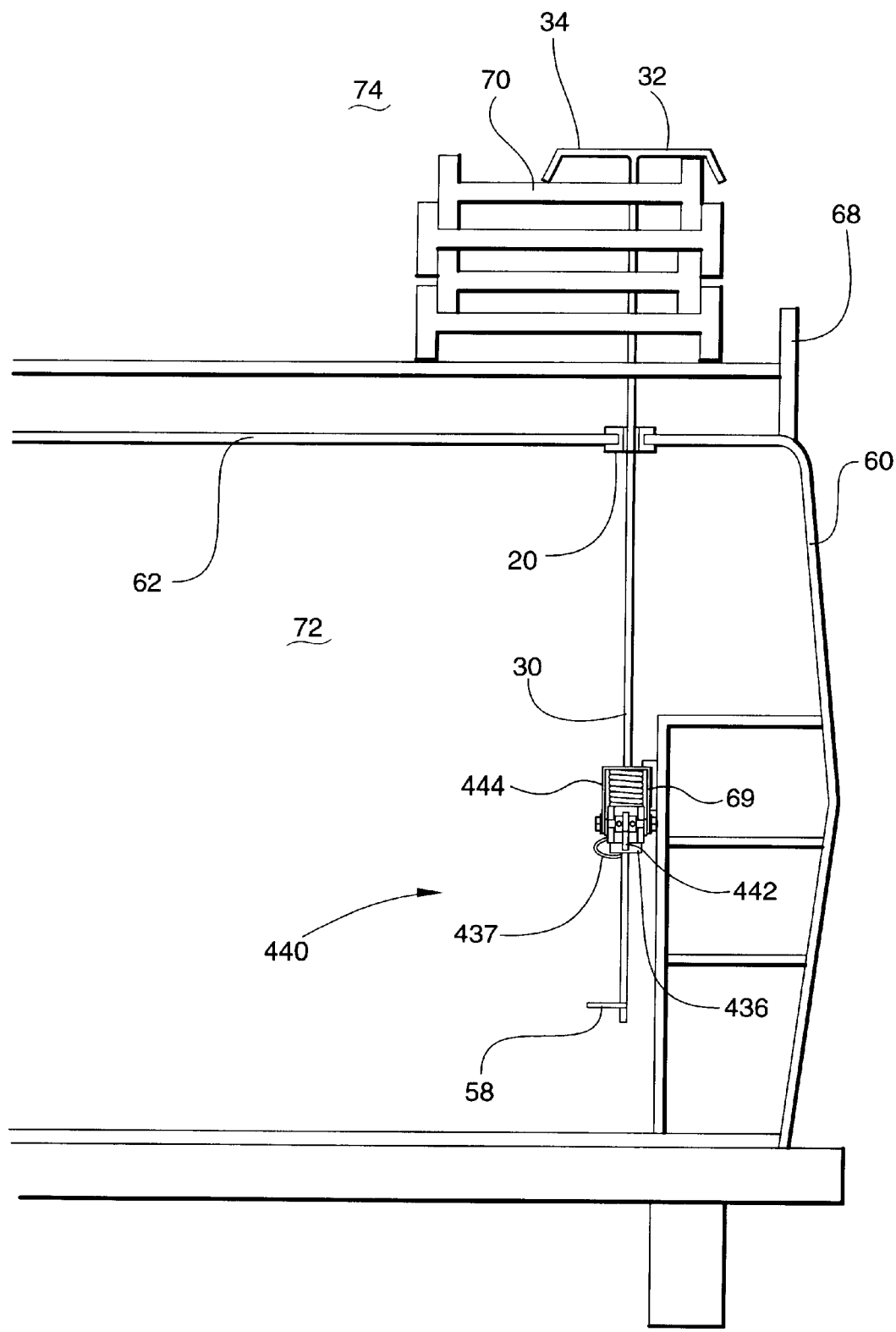
FIG. 28 is an end view of a closed vehicle with the equipment securing apparatus of FIG. 18 installed therein.

Operation of the equipment securing apparatus 410 is similar to that of the previously described embodiments. The latching assembly 440 is first attached to a vehicle to which equipment is to be secured. This may be accomplished in several ways as described in more detail below. To secure equipment to the vehicle, the machine screw 437 is first loosened to allow the shaft 30 to slide through the locking collar 436. The engagement member 32 may then be raised and rotated (if necessary) to position the engagement member 32 for engagement with the equipment 70 as illustrated generally in FIGS. 26–28. As with the previous embodiments, the securing apparatus 410 has a shaft handle 58 to facilitate rotation. The securing apparatus 410 may optionally have a second engagement member 34 as shown in FIGS. 26–28.

With the engagement member 32 in place, the control arm 442 is then rotated in the direction illustrated at 472 in FIG. 21. This causes the slider/spring support member 450 to slide along the shaft 30 toward the upper housing wall 449, thereby compressing spring 438. The control arm 442 is further rotated until it has reached the position shown in FIG. 25. The machine screw 437 is then tightened to lock the locking collar 436 in place on the shaft 30. If an independent locking collar 436 is used, the locking collar 436 should be positioned against the lower surface of the slider/spring support member 450 as shown in FIG. 25 before tightening the machine screw 437. With the locking collar 436 locked to the shaft 30, the control arm 442 is then rotated back to the position shown in FIG. 21. This allows the biasing force of the spring 438 to be applied fully to the shaft 30 through the slider/spring support member 450 and the locking collar 436, thus biasing the engagement member 32 in engagement with the equipment.

The engagement member 432 is preferably disengaged by reversing the above procedure. Alternatively, the engagement member 32 may be quickly disengaged by loosening the machine screw 437 and freeing the shaft 30 from the locking collar 436 with the control arm 442 remaining in the latched position. This, however, will also result in the freeing of the compressed spring 438 in a less controlled manner than may be accomplished through the use of the control arm 442.

The equipment securing apparatus 410 can be used in either a closed panel vehicle such as a van or an open vehicle such as a pickup truck. FIG. 26 illustrates a preferred installation configuration in a closed panel vehicle 76 having an equipment rack 68. In this configuration, a channel 91 is attached to the underside of the roof 62 of the vehicle 76. The channel 91 is attached so as to span two or more lateral roof beams 99. The roof 62 and the channel 91 each have one or more passageways that are substantially in registration to allow passage of the shaft 30 therethrough. The housing 444 of the latching assembly 440 is attached to the channel 91 by any suitable fastening arrangement such as bolts, clamps or the like. The latching assembly 440 is positioned so that the shaft 30 can be inserted through the passageways in the roof 62 and the channel 91 and through the housing wall passage 445 and slider passage 456 of the latching assembly 440. A seal 96 is provided to prevent moisture from entering the interior 72 of the vehicle 76. Once installed, the securing apparatus 410 is operated in the manner described above to secure the ladders 70 or other equipment to the rack 68.

A similar installation for an open vehicle 76*a* with an equipment storage rack 78 is illustrated in FIG. 27. In this configuration, the channel 91 is attached directly to the storage rack 78. The latching assembly 440 is then attached to the channel 91 with the passage 445 in registration with a similar passage in the channel 91 to permit insertion of the shaft 30. Alternatively, depending on the structure of the storage rack 78, the latching assembly 440 may be attached directly to the storage rack 78, allowing the user to dispense with the channel 91.

Another installation configuration for a closed vehicle 76 is illustrated in FIG. 28. In this configuration, the latching assembly 440 is mounted to a shelf or rack 67 in the interior 72 of the vehicle 76. The latching assembly 440 is attached to the rack 67 using a bracket 69 or any other suitable fastening arrangement configured so as not to interfere with the motion of the control arm 442 or the cam lever arm 464. The shaft 30 is passed through a seal 20 disposed within an aperture in the vehicle roof 62. The seal 20 may be a grommet or other sealing mechanism that serves to seal the aperture from leakage and support the shaft 30. Alternatively or in addition, a support arrangement such as that shown in FIG. 4 may be used to further support and stabilize the shaft 30.

It will be understood by those having ordinary skill in the art that the use of the present invention is not restricted to the securing of equipment to a vehicle. Any of the embodiments described herein may be used to secure equipment to fixed or portable support structures of any variety.

The uses of the present invention are vast. The present invention can extend through an upper body panel or side body panel of a van or through a fixed wall. It can also be used on vehicles or structures having open frame equipment support structure. The invention can be used to secure a wide variety of equipment and the engagement arms may be designed to interact with particular equipment.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An equipment securing apparatus for securing equipment to a vehicle, said equipment securing apparatus comprising:

an elongate shaft having a proximal end and a distal end;

an equipment engagement member formed on said distal end of said shaft for securing engagement with equipment on the vehicle; and a latching assembly attachable to a portion of the vehicle, the latching assembly including a housing having an upper wall and a shaft retaining portion with a passageway formed therein, said shaft being slidably mounted to said housing and extending through said passageway of said shaft retaining portion, a spring mounted within said housing adjacent said upper wall, a spring support member and a load transfer member mounted to said shaft, said spring support member and said load transfer member being configured for transferring a biasing force from said spring to said shaft, and a spring compression control assembly operatively connected to said spring support member, said latching assembly being selectively operable to retain said engagement member in a securing relationship with said equipment and to release said engagement member from said securing relationship.

2. An equipment securing apparatus according to claim 1 wherein the latching assembly is operable from an interior portion of the vehicle, the vehicle having body panels defining the interior portion and an area exterior to the vehicle, the equipment to be secured being supported by an exterior surface of the vehicle and at least one of the body panels having at least one body panel opening formed therein, and wherein said elongate shaft is extendable through the at least one body panel opening.

3. An equipment securing apparatus according to claim 1 wherein the spring support member includes a cylindrical bore in substantial registration with said passageway, said shaft being slidably disposed therethrough, and wherein said spring is a helical spring disposed around said shaft intermediate said spring support member and said upper wall.

4. An equipment securing apparatus according to claim 3 wherein said latching assembly further includes a slider guide rod attached to said spring support member and said spring compression control assembly includes a cam lever arm pivotably attached to said housing, a control arm pivotably attached to said housing, and a cam attached to said control arm, said cam lever arm being configured for engaging said cam and said slider guide rod so that rotation of said control arm causes rotation of the cam lever arm and translation of the spring support member.

5. An equipment securing apparatus according to claim 1 wherein said load transfer member includes a locking collar having a collar passage with said shaft slidably extending therethrough.

6. An equipment securing apparatus according to claim 5 wherein the locking collar is attached to the spring support member.

7. An equipment securing apparatus according to claim 1 wherein said shaft includes a plurality of spaced apart holes formed therein and said load transfer member includes a locking pin selectively disposed in one of said plurality of spaced apart holes.

8. An equipment securing apparatus according to claim 1 wherein said engagement member is formed on said shaft and includes a first engagement arm projecting laterally away from said distal end of said shaft.

9. An equipment securing apparatus according to claim 8 wherein said engagement arm is curved to form a hook-like member.

10. An equipment securing apparatus according to claim 8 wherein said engagement member further includes a second engagement arm projecting laterally away from said distal end of said shaft, generally oppositely from said first engagement arm.

11. An equipment securing apparatus according to claim 1 wherein said shaft is rotatably mounted to said shaft retaining portion of said housing so that said shaft may be selectively rotated to move said engagement member to a desired orientation with respect to the equipment to be secured.

12. An equipment securing apparatus according to claim 1 further comprising an elongate support beam having at least one aperture formed therethrough, said elongate support beam being attachable to said vehicle and being configured for attachment of said housing thereto, said housing being selectively attachable to said support beam so that said passageway is in substantial alignment with a selected one of said at least one aperture and said shaft is slidably disposed through said selected one of said at least one aperture.

13. An equipment securing apparatus according to claim 12 wherein said elongate support beam is attachable to the vehicle so that said selected one of said at least one aperture is in substantial alignment with an opening in a body panel of the vehicle and said elongate shaft is extendable through the body panel opening.

14. An equipment securing apparatus for securing equipment to a vehicle, said equipment securing apparatus comprising:

an elongate shaft having a proximal end and a distal end;

an equipment engagement member formed on said distal end of said shaft for securing engagement with equipment on the vehicle; and a latching assembly attachable to a portion of the vehicle, the latching assembly including a housing having an upper wall and a shaft retaining portion with a passageway formed therein, said shaft being slidably mounted to said housing and extending through said passageway of said shaft retaining portion, a spring support member having a cylindrical bore in substantial registration with said passageway, said shaft being slidably disposed therethrough, a helical spring disposed around said shaft intermediate said spring support member and said upper wall, means for transferring a biasing force from said spring to said shaft through said spring support member, means for selectively compressing and decompressing said spring, said latching assembly being selectively operable to retain said engagement member in a securing relationship with said equipment and to release said engagement member from said securing relationship.

15. An equipment securing apparatus according to claim 14 wherein the latching assembly is operable from an interior portion of the vehicle, the vehicle having body panels defining the interior portion and an area exterior to the vehicle, the equipment to be secured being supported by an exterior surface of the vehicle and at least one of the body panels having at least one body panel opening formed therein, and wherein said elongate shaft is extendable through the at least one body panel opening.

16. An equipment securing apparatus according to claim 14 wherein said latching assembly further includes a slider guide rod attached to said spring support member and said means for selectively compressing and decompressing said spring includes a cam lever arm pivotably attached to said housing, a control arm pivotably attached to said housing, and a cam attached to said control arm, said cam lever arm being configured for engaging said cam and said slider guide rod so that rotation of said control arm causes rotation of the cam lever arm and translation of the spring support member.

17. An equipment securing apparatus according to claim 14 wherein said means for transferring a biasing force includes a locking collar having a collar passage with said shaft slidably extending therethrough.

18. An equipment securing apparatus according to claim 17 wherein the locking collar is attached to the spring support member.

19. An equipment securing apparatus according to claim 14 wherein said means for transferring a biasing force includes a plurality of spaced apart holes formed in said shaft and a locking pin selectively disposed in one of said plurality of spaced apart holes.

20. An equipment securing apparatus according to claim 14 wherein said engagement member is formed on said shaft and includes a first engagement arm projecting laterally away from said distal end of said shaft.

21. An equipment securing apparatus according to claim 14 further comprising an elongate support beam having at least one aperture formed therethrough, said elongate support beam being attachable to said vehicle and being configured for attachment of said housing thereto, said housing being selectively attachable to said support beam so that said passageway is in substantial alignment with a selected one of said at least one aperture and said shaft is slidably disposed through said selected one of said at least one aperture.

22. An equipment securing apparatus according to claim 21 wherein said elongate support beam is attachable to the vehicle so that said selected one of said at least one aperture is in substantial alignment with an opening in a body panel of the vehicle and said elongate shaft is extendable through the body panel opening.

23. An equipment securing apparatus for securing equipment to a vehicle, said equipment securing apparatus comprising:

an elongate shaft having a proximal end and a distal end;

an equipment engagement member formed on said distal end of said shaft for securing engagement with equipment on the vehicle; and a latching assembly attachable to a portion of the vehicle, the latching assembly including a housing having an upper wall and a shaft retaining portion with a passageway formed therein, said shaft being slidably mounted to said housing and extending through said passageway of said shaft retaining portion, a helical spring mounted within said housing adjacent said upper wall, said spring being disposed around said shaft, a spring support member having a cylindrical bore in substantial registration with said passageway, said shaft being slidably disposed therethrough and said spring being disposed intermediate said spring support member and said upper wall, a slider guide rod attached to said spring support member, a load transfer member mounted to said shaft, said load transfer member and said spring support member being configured for transferring a biasing force from said spring to said shaft, and a spring compression control assembly operatively connected to said spring support member, said spring compression control assembly including a cam lever arm pivotably attached to said housing, a control arm pivotably attached to said housing, and a cam attached to said control arm, said cam lever arm being configured for engaging said cam and said slider guide rod so that rotation of said control arm causes rotation of the cam lever arm and translation of the spring support member, said latching assembly being selectively operable to retain said engagement member in a securing relationship with said equipment and to release said engagement member from said securing relationship.

24. An equipment securing apparatus according to claim 23 wherein the latching assembly is operable from an interior portion of the vehicle, the vehicle having body panels defining the interior portion and an area exterior to the vehicle, the equipment to be secured being supported by an exterior surface of the vehicle and at least one of the body panels having at least one body panel opening formed therein, and wherein said elongate shaft is extendable through the at least one body panel opening.

25. An equipment securing apparatus according to claim 23 wherein said load transfer member includes a locking collar having a collar passage with said shaft slidably extending therethrough.

26. An equipment securing apparatus according to claim 25 wherein the locking collar is attached to the spring support member.

27. An equipment securing apparatus according to claim 23 wherein said shaft includes a plurality of spaced apart holes formed therein and said load transfer member includes a locking pin selectively disposed in one of said plurality of spaced apart holes.

28. An equipment securing apparatus according to claim 23 wherein said engagement member is formed on said shaft and includes an engagement arm projecting laterally away from said distal end of said shaft.

29. An equipment securing apparatus according to claim 23 further comprising an elongate support beam having at least one aperture formed therethrough, said elongate support beam being attachable to said vehicle and being configured for attachment of said housing thereto, said housing being selectively attachable to said support beam so that said passageway is in substantial alignment with a selected one of said at least one aperture and said shaft is slidably disposed through said selected one of said at least one aperture.

30. An equipment securing apparatus according to claim 29 wherein said elongate support beam is attachable to the vehicle so that said selected one of said at least one aperture is in substantial alignment with an opening in a body panel of the vehicle and said elongate shaft is extendable through the body panel opening.

31. An equipment securing apparatus for securing equipment to a support structure, said equipment securing apparatus comprising:

an elongate shaft having a proximal end and a distal end;

an equipment engagement member formed on said distal end of said shaft for securing engagement with equipment on the support structure; and a latching assembly including a shaft support member attachable to a portion of the support structure, the shaft support member having a shaft retaining portion with a first passageway formed therein, said shaft being slidably disposed therethrough, a spring support member having a second passageway in substantial registration with said first passageway, said shaft being slidably disposed therethrough, a helical spring disposed around said shaft intermediate said shaft support member and said spring support member, means for transferring a biasing force from said spring to said shaft through said spring support member, means for selectively compressing and decompressing said spring, said latching assembly being selectively operable to retain said engagement member in a securing relationship with said equipment and to release said engagement member from said securing relationship.

* * * * *